(12) United States Patent
Richardson et al.

(10) Patent No.: US 9,750,191 B2
(45) Date of Patent: Sep. 5, 2017

(54) ELECTRO-HYDRAULIC DRIVE SYSTEM

(71) Applicant: Parker-Hannifin Corporation, Cleveland, OH (US)

(72) Inventors: Jason Scot Richardson, Chuckey, TN (US); Ryan Schroeder, Greeneville, TN (US); Victor Connor, Afton, TN (US); Kenneth Jackson, Greeneville, TN (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 15/254,674

(22) Filed: Sep. 1, 2016

(65) Prior Publication Data

US 2016/0366824 A1 Dec. 22, 2016

Related U.S. Application Data

(63) Continuation of application No. 13/891,777, filed on May 10, 2013, now Pat. No. 9,435,324.

(Continued)

(51) Int. Cl.
*B62D 11/02* (2006.01)
*B62D 11/04* (2006.01)
*A01D 69/02* (2006.01)
*F04B 17/03* (2006.01)
*B60K 17/10* (2006.01)
*A01D 69/03* (2006.01)
*F01C 1/10* (2006.01)
*F04C 2/10* (2006.01)

(Continued)

(52) U.S. Cl.
CPC ........... *A01D 69/025* (2013.01); *A01D 69/03* (2013.01); *B60K 17/105* (2013.01); *F01C 1/103* (2013.01); *F04B 17/03* (2013.01); *F04C 2/102* (2013.01); *F04C 15/008* (2013.01); *F15B 11/17* (2013.01); *H02K 7/006* (2013.01); *H02K 7/1815* (2013.01); *B60Y 2200/223* (2013.01); *B60Y 2200/90* (2013.01); *F04C 2240/40* (2013.01); *F15B 2211/2053* (2013.01); *F15B 2211/20515* (2013.01); *F15B 2211/7058* (2013.01)

(58) Field of Classification Search
CPC ............................. B62D 11/02; B62D 11/04
See application file for complete search history.

(56) References Cited

U.S. PATENT DOCUMENTS 3,309,870 A * 3/1967 Pinkerton ............... F16H 39/14
60/328
3,416,623 A * 12/1968 Boone .................... B60K 17/10
180/6.48

(Continued)

*Primary Examiner* — Bryan Evans
(74) *Attorney, Agent, or Firm* — Renner, Otto, Boisselle & Sklar, LLP

(57) ABSTRACT

Provided is an electro-hydraulic drive system including first and second electro-hydraulic transmissions for driving respective wheels, the transmissions each including an electric motor, a hydraulic pump driven by the electric motor, and a hydraulic motor drive by the hydraulic pump. When used in a turf vehicle, such as a zero-turn-radius mower, the electro-hydraulic drive system operates the wheels independently from an engine of the mower, thereby allowing the mower to be moved without having to start the engine. In this way, power consumption is lowered and total efficiency of the mower is increased.

18 Claims, 23 Drawing Sheets

Related U.S. Application Data

(60) Provisional application No. 61/645,111, filed on May 10, 2012.

(51) Int. Cl.
    *F04C 15/00*     (2006.01)
    *F15B 11/17*     (2006.01)
    *H02K 7/00*     (2006.01)
    *H02K 7/18*     (2006.01)

(56) References Cited

U.S. PATENT DOCUMENTS

| | | | |
|---|---|---|---|
| 5,791,366 A | 8/1998 | Lo | |
| 6,311,487 B1 | 11/2001 | Ferch | |
| 6,543,560 B1* | 4/2003 | Trefz | B60K 25/02 180/305 |
| 7,841,432 B2 | 11/2010 | Lynn et al. | |
| 8,157,626 B2 | 4/2012 | Day | |
| 9,435,324 B2* | 9/2016 | Richardson | F04B 17/03 |
| 2006/0007799 A1 | 1/2006 | Yoshinaga et al. | |
| 2006/0039801 A1* | 2/2006 | Dong | F03C 1/0663 417/269 |
| 2008/0083222 A1* | 4/2008 | Hubert | B60K 6/46 60/698 |
| 2010/0101759 A1 | 4/2010 | Campbell et al. | |
| 2011/0067934 A1* | 3/2011 | Dong | B60K 7/0015 180/6.2 |
| 2011/0085928 A1* | 4/2011 | Lyons | F03C 2/08 418/61.3 |

* cited by examiner

ELECTRO-HYDRAULIC DRIVE SYSTEM

RELATED APPLICATIONS

This application is a continuation of U.S. application Ser. No. 13/891,777 filed May 10, 2013 which claims the benefit of U.S. Provisional Application No. 61/645,111 filed May 10, 2012, both of which are hereby incorporated herein by reference.

FIELD OF INVENTION

The present invention relates generally to transmissions, and more particularly to transmissions for use in vehicles, such as mowing machines.

BACKGROUND

Hydrostatic transmissions have many uses, including the propelling of vehicles, such as mowing machines. A typical hydrostatic transmission system includes a variable displacement hydraulic pump connected in a closed hydraulic circuit with a fixed or variable displacement hydraulic motor. The closed hydraulic circuit includes a first conduit connecting the main pump outlet with the motor inlet and a second conduit connecting the motor outlet with a pump inlet. Either of these conduits may be the high pressure line depending upon the direction of pump displacement from neutral. For most applications, the pump is driven by a prime mover, such as an internal combustion engine or an electrical motor, at a certain speed in a certain direction. Changing the displacement of the main pump will change its output flow rate, which controls the speed of the motor. Pump outflow can be reversed, thus reversing the direction of the motor. In a vehicle, the motor is often connected through suitable gearing to the vehicle's wheels or tracks.

In some vehicles, such as zero-turn-radius mowers, separate hydraulic pumps and motors are used to independently drive separate wheels of an axle. By independently driving the wheels in opposite directions, for example, the vehicle can be made to turn with zero radius. Zero-turn-radius mowers are increasingly popular as the size and costs of such mowers decrease. As the size of such mowers decreases, however, the space available for the hydraulic components and/or the prime mover also decreases.

SUMMARY OF INVENTION

The present invention provides an electro-hydraulic drive system including first and second electro-hydraulic transmissions for driving respective wheels, the transmissions each including an electric motor, a hydraulic pump driven by the electric motor, and a hydraulic motor drive by the hydraulic pump. When used in a turf vehicle, such as a zero-turn-radius mower, the electro-hydraulic drive system operates the wheels independently from an engine of the mower, thereby allowing the mower to be moved without having to start the engine. In this way, power consumption is lowered and total efficiency of the mower is increased.

According to an aspect of the invention, an electro-hydraulic drive system is provided that includes a first electro-hydraulic transmission for driving a first wheel, the first electro-hydraulic transmission including a first electric motor, a first hydraulic pump coupled to and driven by the first electric motor, and a first hydraulic motor coupled to and driven by the first hydraulic pump, the hydraulic motor including an output shaft for driving the wheel, and a second electro-hydraulic transmission for driving a second wheel, the second electro-hydraulic transmission including a second electric motor, a second hydraulic pump coupled to and driven by the second electric motor, and a second hydraulic motor coupled to and driven by the second hydraulic pump, the hydraulic motor including an output shaft for driving the wheel.

In an embodiment, the apparatus further includes at least one controller coupled to the first and second electric motors for controlling the first and second electric motors.

In another embodiment, the apparatus further includes a storage device coupled to the controller, wherein the storage device is configured to power the first and second electric motors.

In still another embodiment, the storage device includes at least one battery and/or capacitor.

In yet another embodiment, the first and second hydraulic pumps are gerotor pumps.

In a further embodiment, the first and second hydraulic motors are gerotor motors.

In another embodiment, the first and second electro-hydraulic transmissions additionally include first and second reservoirs respectively for fluid to flow to/from the respective hydraulic pump.

In still another embodiment, the first and second electro-hydraulic transmissions additionally include first and second pump plates that house the first and second hydraulic pumps respectively.

In yet another embodiment, the first and second electro-hydraulic transmissions additionally include first and second porting plates, each porting plate having a pump mount surface coupled to the respective pump plate and a motor mount surface coupled to an end port plate of the respective hydraulic motor, wherein the porting plates include first and second fluid passages for directing hydraulic fluid between the hydraulic pumps and hydraulic motors.

In a further embodiment, the pump mount surface of the porting plate includes a path for allowing hydraulic fluid to flow to/from a cavity in the pump mount surface below the hydraulic pump from/to a reservoir.

In another embodiment, the first and second electro-hydraulic transmissions additionally include first and second valve plates coupled to the first and second pump plates respectively on sides of the pump plates opposite the porting plates, wherein the valve plates house respective bypass valves for bypassing the electro-hydraulic drive system.

In still another embodiment, the first and second electric motors include respective output shafts that directly drive the first and second hydraulic pumps respectively.

In a further embodiment, the first and second electric motors include first and second output shafts respectively, and the first and second hydraulic pumps include first and second input shafts respectively, wherein the first and second output shafts are respectively coupled to the first and second input shafts for driving the respective hydraulic pumps.

According to another aspect of the invention, a mower is provided that includes a frame, a mower deck supported by the frame, an engine mounted to the frame and configured to power the mower deck, an electro-hydraulic drive system including a first electro-hydraulic transmission for driving a first wheel, the first electro-hydraulic transmission including a first electric motor, a first hydraulic pump coupled to and driven by the first electric motor, and a first hydraulic motor coupled to and driven by the first hydraulic pump, the hydraulic motor including an output shaft for driving the wheel and a second electro-hydraulic transmission for driving a second wheel, the second electro-hydraulic transmission including a second electric motor, a second hydraulic pump coupled to and driven by the second electric motor, and a second hydraulic motor coupled to and driven by the second hydraulic pump, the hydraulic motor including an output shaft for driving the wheel and a controller coupled to the first and second electric motors for controlling the first and second motors.

In an embodiment, the storage device is coupled to the controller, wherein the storage device is configured to power the first and second electric motors.

In another embodiment, the mower further includes a generator coupled to the controller and an output shaft of the engine, the generator being configured to charge the storage device.

In still another embodiment, the electro-hydraulic drive system operates independently from the engine.

In yet another embodiment, the controller is configured to receive inputs from wheel speed sensors, engine rpm, deck spindle speed, hand lever position, engine load, and/or battery/motor current draw to adjust control of the first and second electric motors.

According to another aspect of the invention, an integrated electro-hydraulic transmission for driving a wheel in a turf vehicle is provided, the transmission including an electric motor, a gerotor pump coupled to and driven by the electric motor, and a gerotor motor coupled to and driven by the gerotor pump, the gerotor motor including an output shaft for driving the wheel.

In an embodiment, the electric motor includes an output shaft that directly drives the gerotor pump.

In another embodiment, a second integrated electro-hydraulic transmission is provided, wherein the second integrated electro-hydraulic transmission includes an electric motor, a gerotor pump coupled to and driven by the electric motor, and a gerotor motor coupled to and driven by the gerotor pump, the gerotor motor including an output shaft for driving a second wheel.

The foregoing and other features of the invention are hereinafter described in greater detail with reference to the accompanying drawings.

DETAILED DESCRIPTION

The principles of the present invention have particular application to mowers, such as zero-turn-radius mowers, and thus will be described below chiefly in this context. It will, of course, be appreciated and also understood that the principles of the application may be useful in other vehicles, such as vehicles utilizing mechanical, hydrostatic, hydraulic, or electric drive systems.

Figure 1:
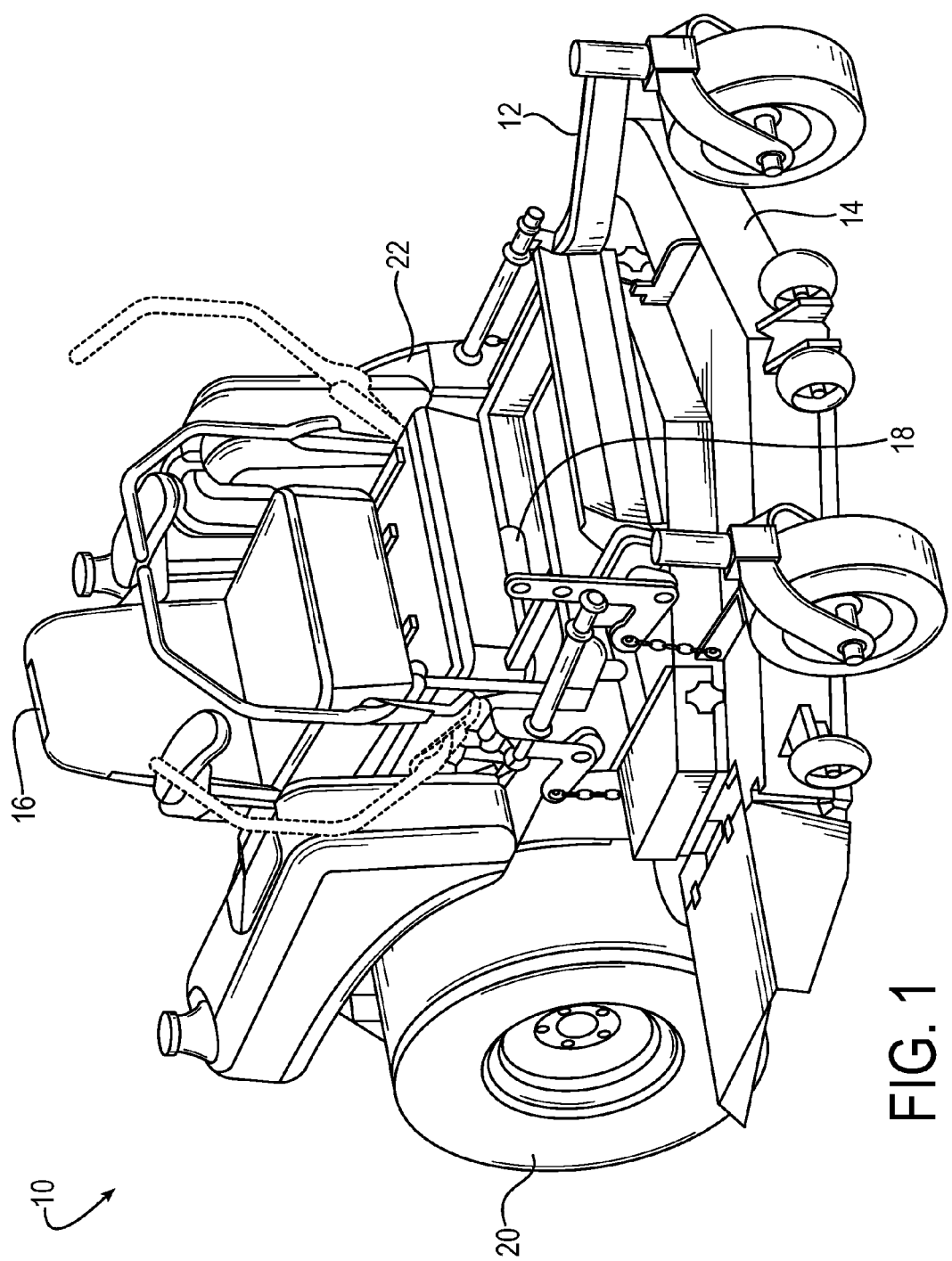
FIG. 1 is a perspective view of an exemplary zero-turn-radius mower employing a hydro-electric transmission to which the principles of the invention can be applied, as discussed below.

Referring now to the drawings in detail, and initially to FIG. 1, an exemplary zero-turn-radius mower 10 is illustrated. The mower 10 includes a frame 12, a mower deck 14 supported by the frame 12 for mowing grass, an operator seat 16, and a plurality of controls 18 for operating the mower 10. A rear mounted engine 30 (FIG. 2) mounted to the frame 12 behind the seat 16 provides power to the mower deck 14 and/or attachments. The engine 30 may be any suitable engine, such as a gasoline engine, a diesel engine, a propane engine, etc. that drives a belt or power take-off connected to the mower deck 14 and/or attachments. The engine may be a relatively small engine, such as a 10-15 horsepower engine. The design of the illustrated mower 10 is merely exemplary in nature, and it will be appreciated that other mower designs and vehicle types can be used in accordance with the invention.

Figure 2:
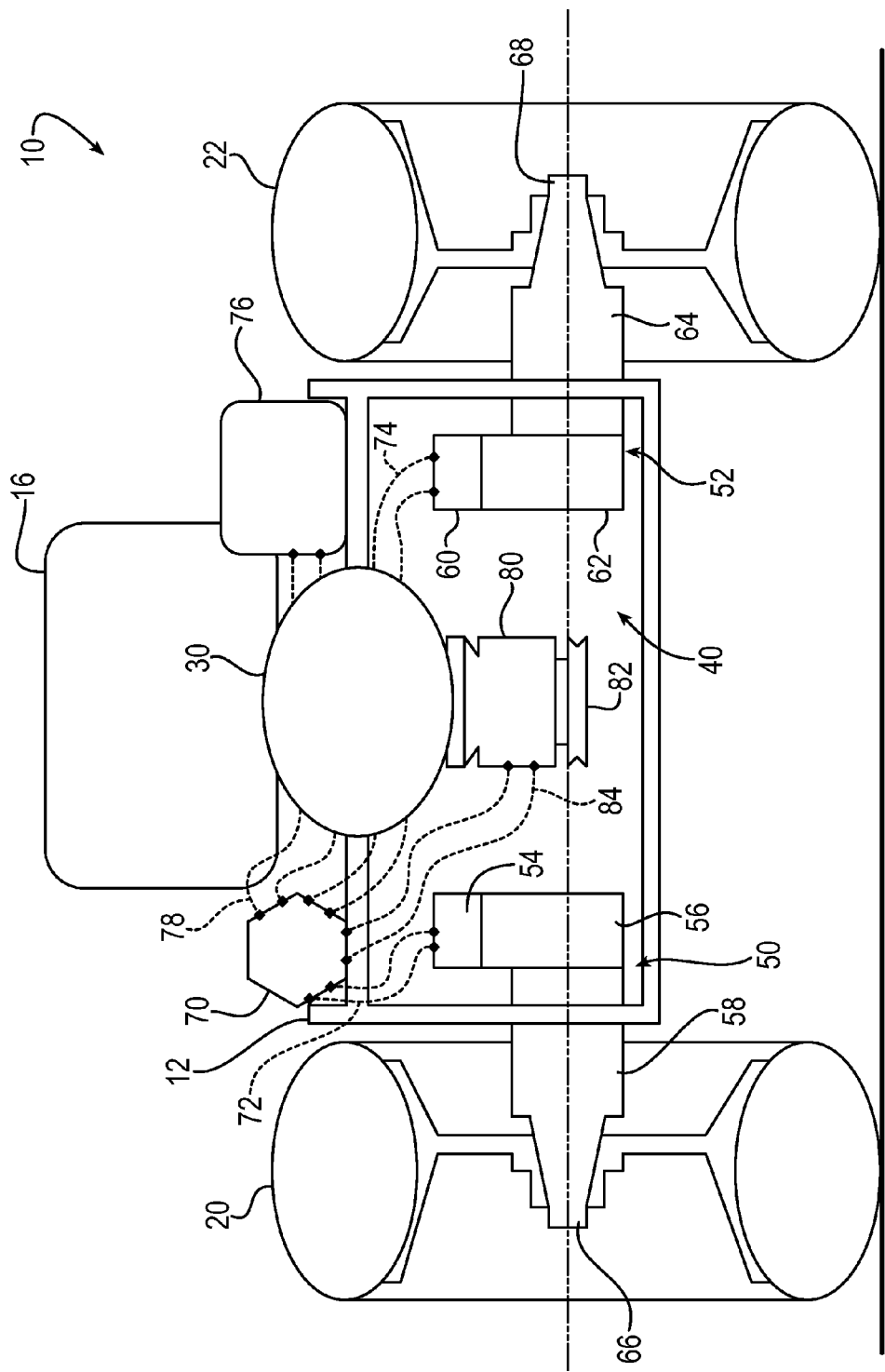
FIG. 2 is a schematic view of the zero-turn-radius mower.

Turning now to FIG. 2, a schematic view of the mower 10 is shown. The exemplary mower 10 includes an electro-hydraulic drive system 40, which is a hybrid drive system for vehicles utilizing mechanical, hydrostatic, hydraulic, or electric drive systems. The engine 30 powers the mower deck 14 and/or attachments, while first and second electro-hydraulic transmissions 50 and 52 of the electro-hydraulic drive system 40 are controlled independently from the engine 30 by a controller 70 to drive respective rear wheels 20 and 22 to propel the mower 10 and provide zero-turn-radius functionality.

The first electro-hydraulic transmission 50 includes a first electric motor 54, a first hydraulic pump 56 coupled to and driven by the first electric motor 54, and a first hydraulic motor 58 coupled to and driven by the first hydraulic pump 56. Similarly, the second electro-hydraulic transmission 52 includes a second electric motor 60, a second hydraulic pump 62 coupled to and driven by the second electric motor 60, and a second hydraulic motor 64 coupled to and driven by the second hydraulic pump 62.

Figure 3:
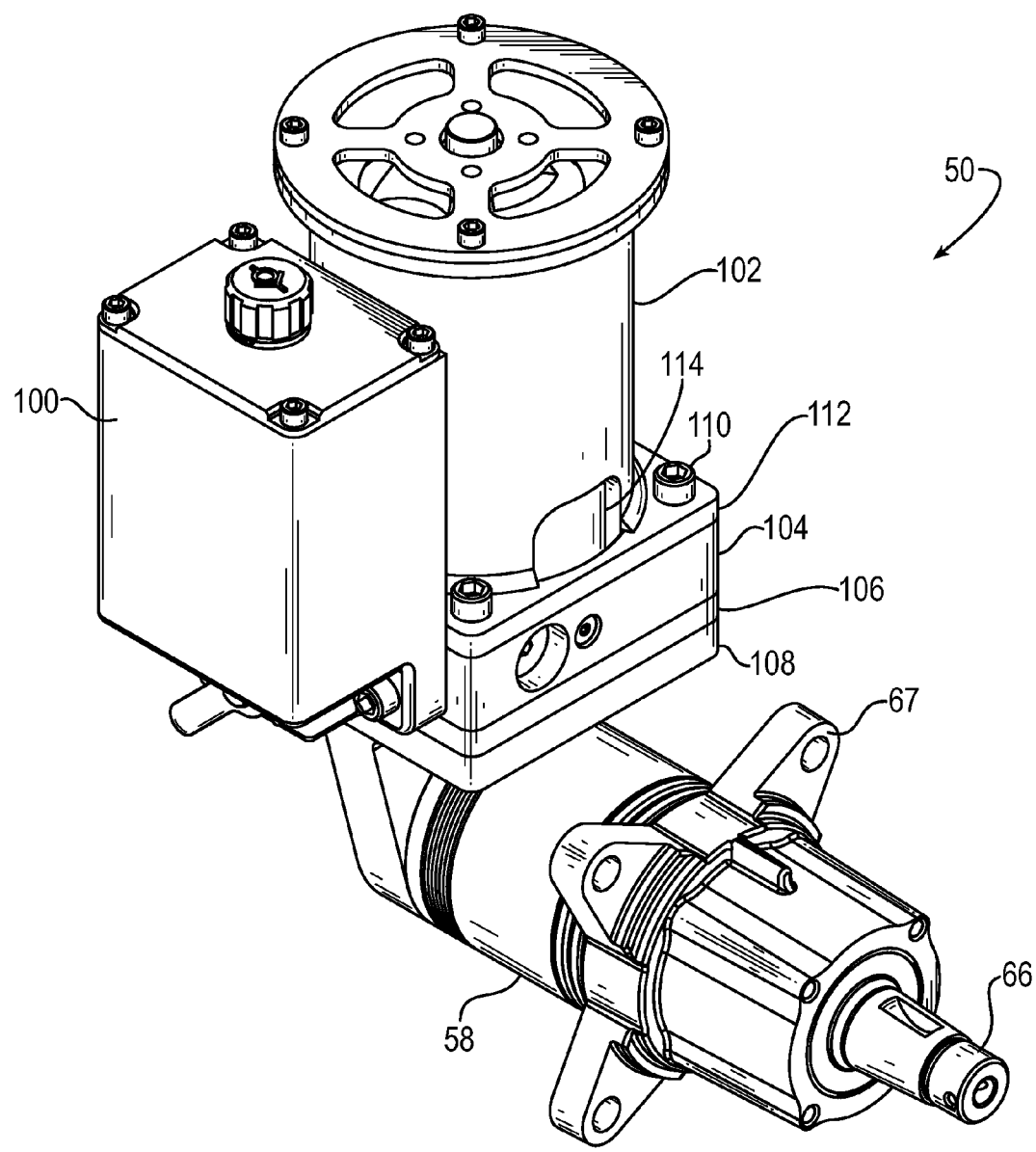
FIG. 3 is a perspective view of an exemplary left hand electro-hydraulic drive assembly.
Figure 4:
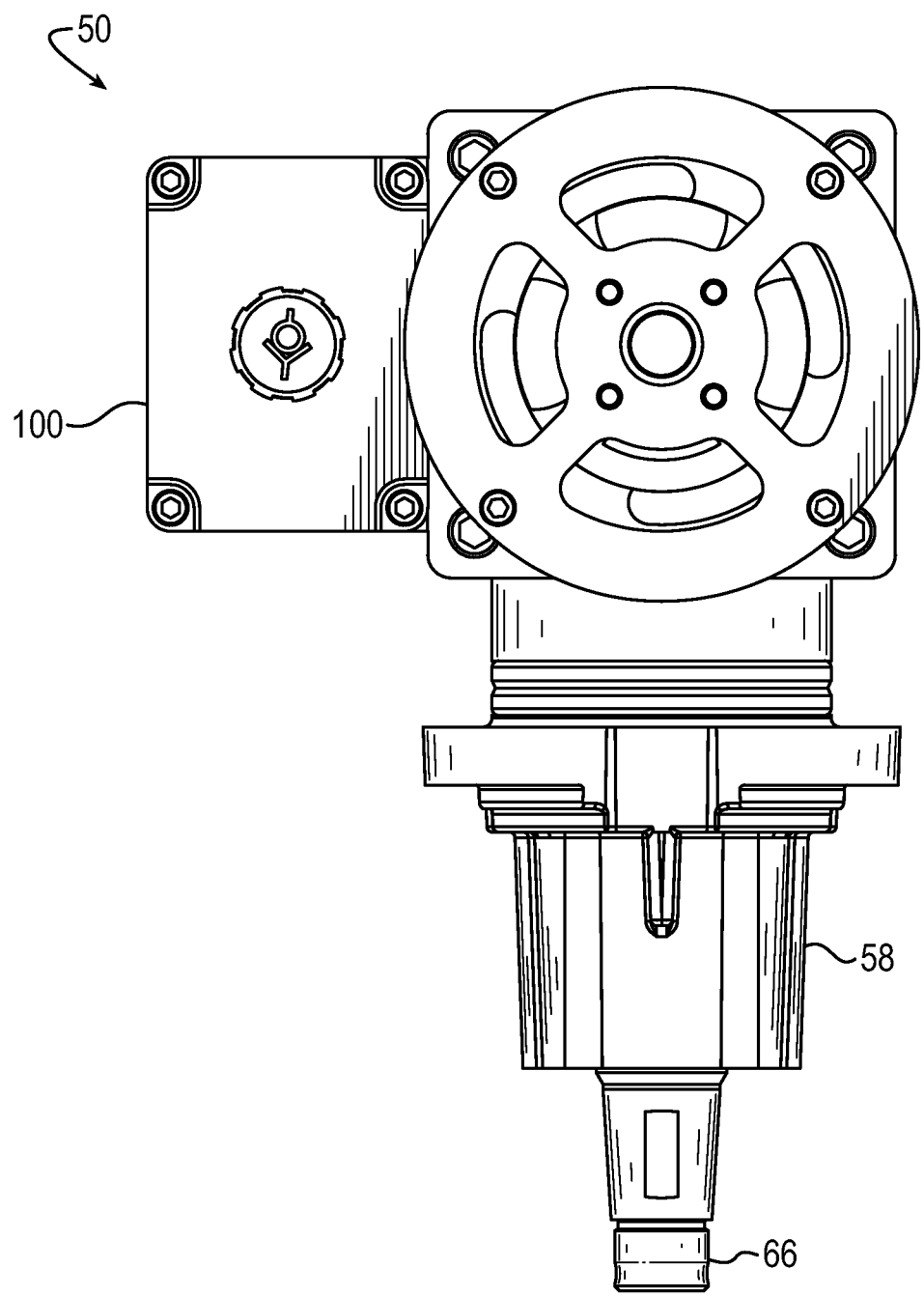
FIG. 4 is a top view of the left hand electro-hydraulic drive assembly.
Figure 5:
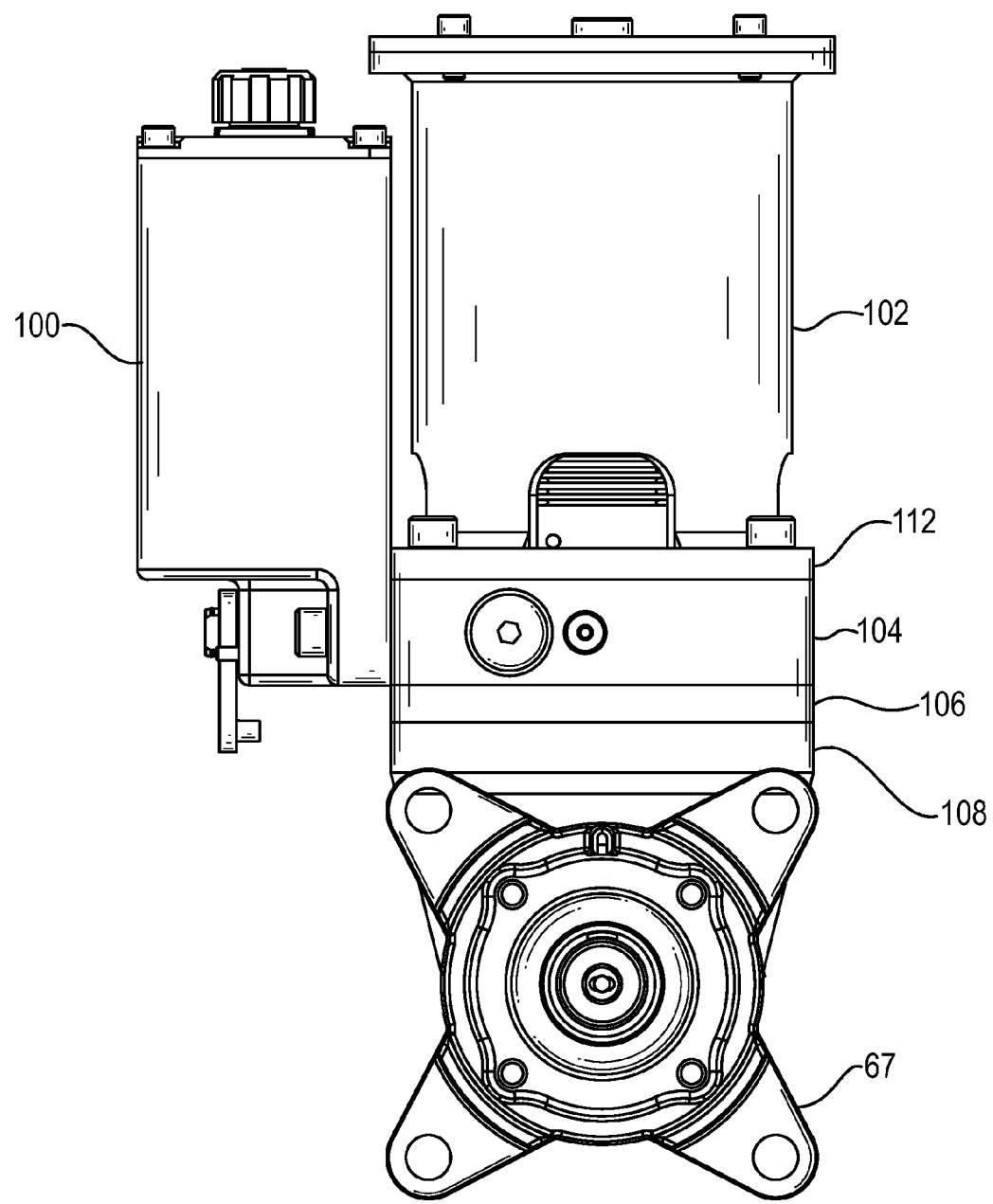
FIG. 5 is a front view of the left hand electro-hydraulic drive assembly.
Figure 6:
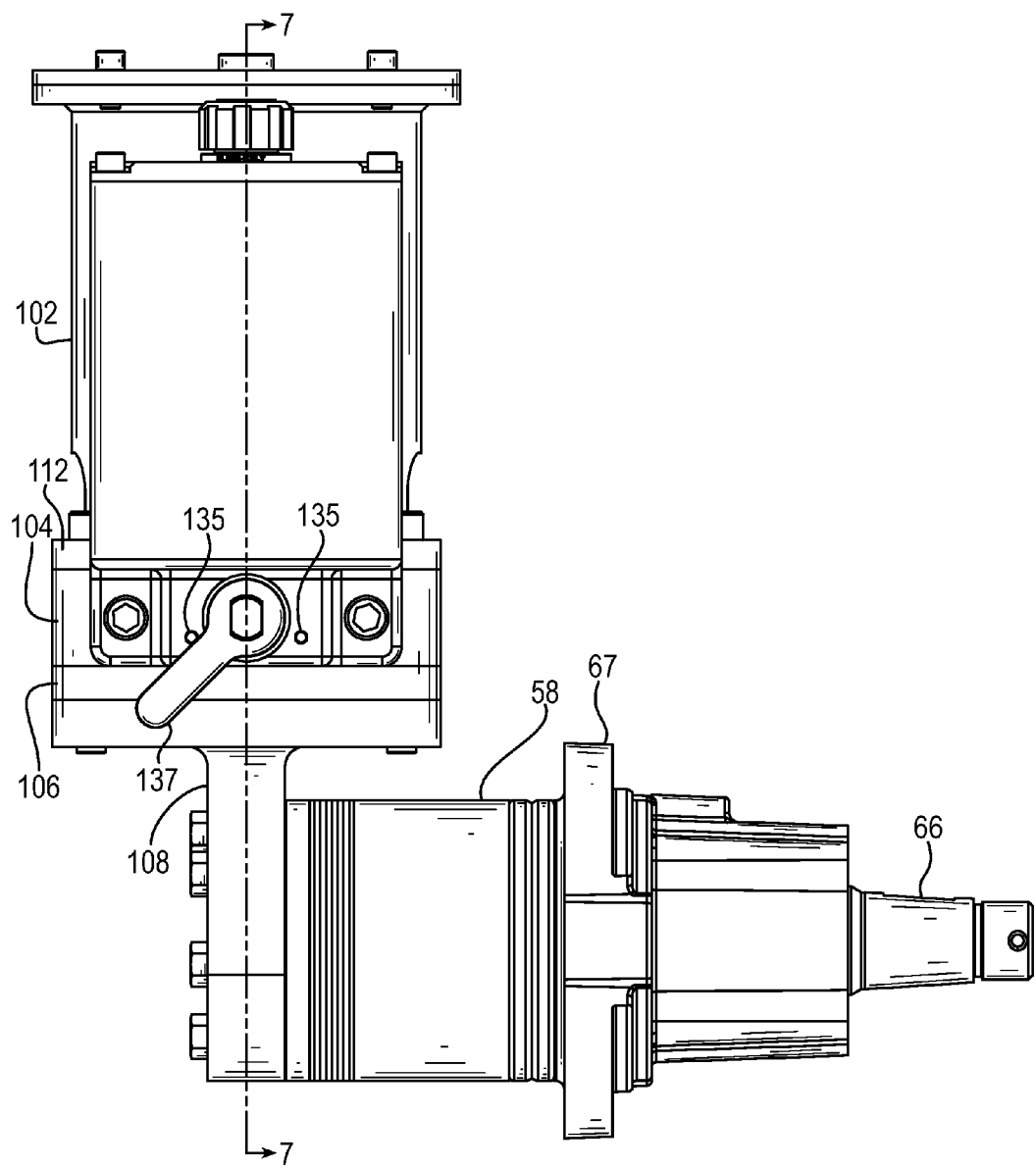
FIG. 6 is a left side view of the left hand electro-hydraulic drive assembly.

The first and second electric motors 54 and 60 may be any suitable electric motor, such as high voltage brushless DC motor, for example a 48 v motor. The first and second hydraulic pumps 56 and 62 may be any suitable pump, such as a gerotor pump, for example a small displacement 4.5 cc gerotor pump. The first and second hydraulic motors 58 and 64 may be any suitable motor, such as a low speed/high torque gerotor motor, for example a 260 cc gerotor motor. The first and second hydraulic motors 58 and 64 include first and second output shafts 66 and 68, respectively, that may be coupled to an axle shaft or that may serve as the axle shaft for driving the respective wheels 20 and 22. The first and second hydraulic motors are also provided with attachment lugs 67 (FIG. 3) having through holes for receiving fasteners for mounting the hydraulic motors 66 and 68, and thereby the first and second electro-hydraulic transmissions 50 and 52, to the mower 50.

Coupled to the first and second electric motors 54 and 60 is the controller 70, which may be coupled to the motors in any suitable manner, such as by suitable conductors 72 and 74. The controller 70 is configured to receive inputs from wheel speed sensors, engine rpm, deck spindle speed, hand lever position, engine load, battery/motor current draw, etc. Based on the inputs, the controller 70 can command the electro-hydraulic system 40 to operate and react to provide for high system efficiency during operation, and the inputs may additionally be used by programs in software in the controller to increase control, safety, and system life.

For example, the controller 70 may provide increased efficiency by allowing the engine to be revolution matched to a prevailing turf condition, such as by reducing/increasing the engine speed based on tip speed of mower blades. For example, mowing light grass at a slow pace requires less energy to the mowing deck/blades than mowing heavy grass, and therefore the controller 70 is configured to alter the engine speed to conserve energy. The controller 70 may also be configured to limit wheel speed/torque automatically to prevent skidding and/or turf digging during turns. The controller 70 may additionally be configured to provide an auto tracking feature to keep the mower moving straight during a long stretch of turf. The controller 70 may further be configured to allow for different driving styles, such as aggressive or compliant driving styles, to be available via a button or switch on the mower 10 to add scalable performance and tuneability.

The controller 70 is also coupled to a power storage device 76, such as a battery, plurality of batteries, capacitor, plurality of capacitors or combination thereof, in any suitable manner, such as by suitable conductors 78 to provide power to the first and second electro-hydraulic drive assemblies 50 and 52. The storage device 76 allows the electro-hydraulic drive system 40 to be run independently from the engine 30, thereby allowing the mower 10 to be driven, for example to be moved on/off a trailer and to/from a mowing site, without running the engine 30.

The power storage device 76 may be charged in any suitable manner, such as by a standard charging system when the mower 10 is not being used. Additionally or alternatively, the mower 10 may include an alternator/generator 80 coupled to the controller 70 to charge the power storage device 76. The alternator/generator 80 may also be coupled to an output shaft of the engine 30 along with a clutch for a pulley/belt drive 82. The alternator/generator 80 may be coupled to the controller 70 in any suitable manner, such as by conductors 84. The alternator/generator 80 may be provided to extend battery life or to allow for a battery-less system architecture. The alternator/generator 80 and/or the standard charging system supply energy to the first and second electric motors 54 and 60 and/or the power storage device 76 via the controller 70 and suitable software.

By using the electro-hydraulic drive system 40, the engine 30 does not need to be started until it is desired to operate the mower deck 14, thereby lowering power consumption and increasing total efficiency of the mower 10. It will also be appreciated that because the engine 30 does not power the electro-hydraulic drive system 40, parasitic losses are avoided that result from, for example, running a hydraulic system, and specifically a hydraulic pump, at full speed while the mower is at rest or operating at a low speed. Moreover, by providing the electro-hydraulic drive system 40 to power the wheels 20 and 22 and the engine 30 to power the mower deck 14 and/or attachments, the mower 10 may be operated at longer run times at required torques without requiring large motors and large controllers that add weight and take up space in the mower.

Turning now to FIGS. 3-10, an embodiment of the first electro-hydraulic drive assembly 50 is shown. The first electro-hydraulic drive assembly 50 is shown as a left hand electro-hydraulic drive assembly. FIGS. 11-16 show an embodiment of the second electro-hydraulic drive assembly 52, which is shown as a right hand assembly. It will be appreciated that the right hand assembly is substantially the same as the left hand assembly, and thus will not be described in detail.

As noted above, the first electro-hydraulic drive assembly 50 includes the first electric motor 54, the first hydraulic pump 56, and the first hydraulic motor 58. The first electro-hydraulic drive assembly 50 also includes a reservoir 100 having a lid 101 and breather 103, a casing 102, a valve plate 104, a pump plate 106, and a porting plate 108. One or more bolts 110 extends through bolt holes in a plate 112 coupled to or integrally formed with the casing 102, the valve plate 104, the pump plate 106, and the porting plate 108 to couple the plates.

Figure 7:
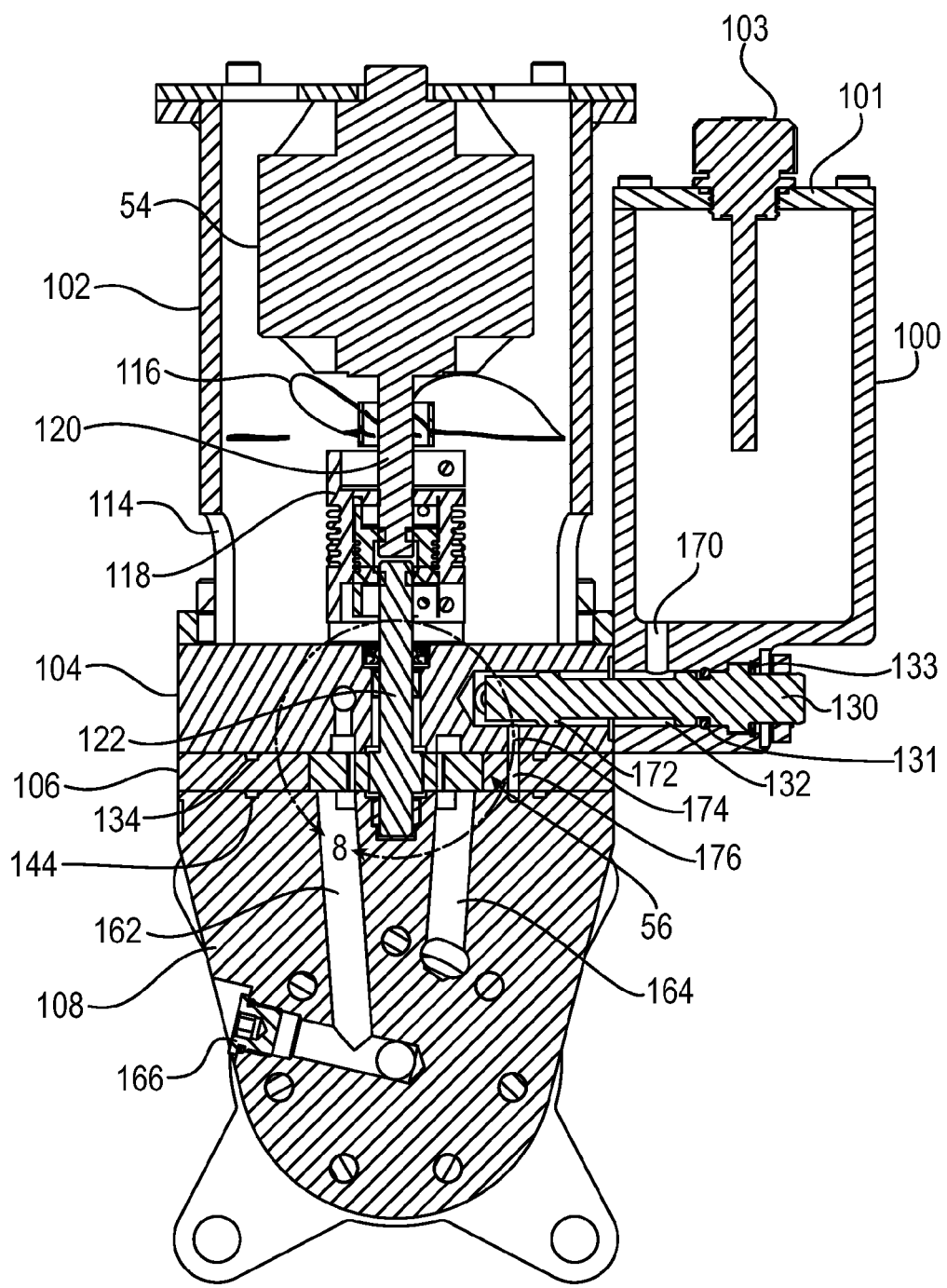
FIG. 7 is a cross-sectional view of the left hand electro-hydraulic drive assembly taken about line A-A in FIG. 6.
Figure 8:
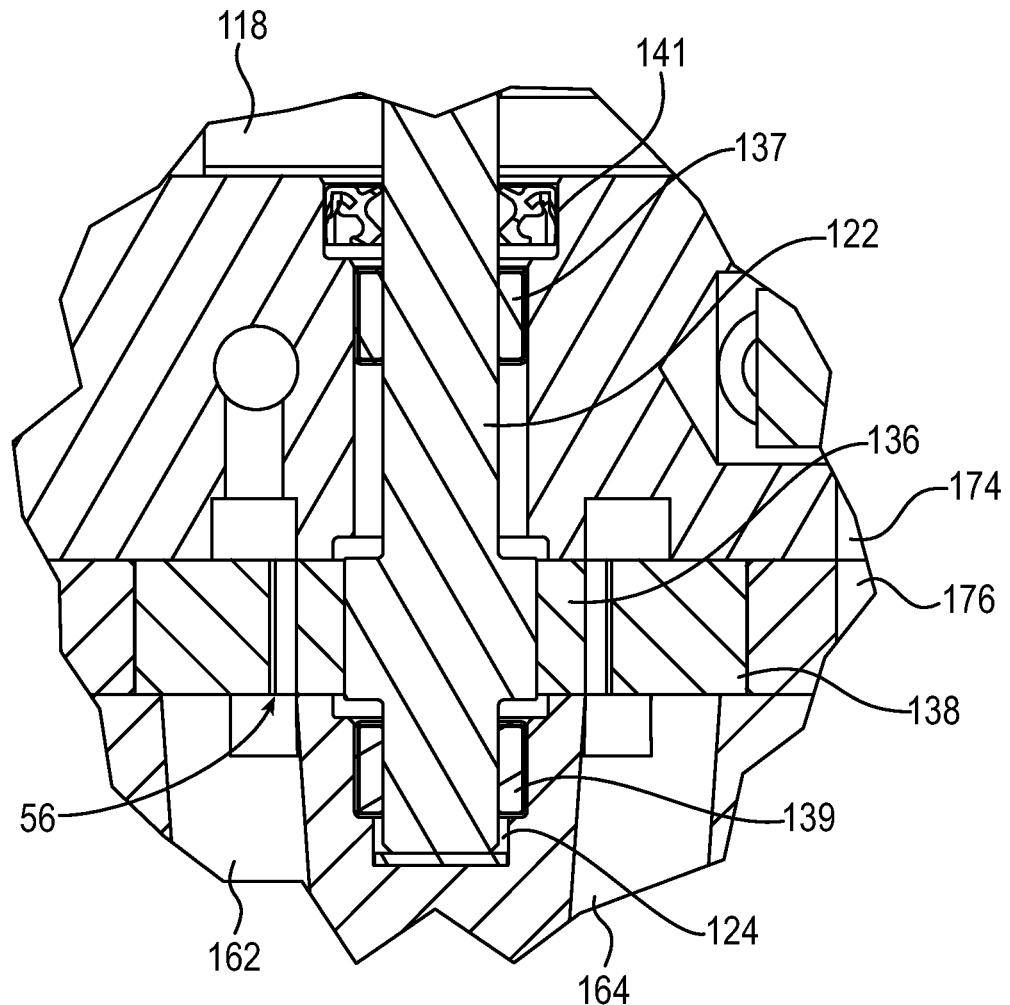
FIG. 8 is an enlarged view of section B-B in FIG. 7.

As best shown in FIG. 7, the casing 102 houses the electric motor 54 and includes one or more openings 114 for allowing air to flow into and out of the casing 102. The casing 102 also houses is a fan 116 for cooling the electric motor 54 and a coupler 118 that couples an output shaft 120 of the electric motor 54 to a first end of an input shaft 122 that drives the hydraulic pump 56. The input shaft extends from the casing 102 through the valve plate 104 and the pump plate 106, and a second end of the input shaft 122 is disposed in a cavity 124 in the porting plate 108.

The valve plate 104 is disposed between the casing 102 and the pump plate 106 and houses suitable valves for controlling hydraulic fluid flow to the hydraulic pump 56. The valve plate 104 also houses a bypass valve 130 in a bypass chamber 132. The bypass valve 130 may be operated to allow fluid to flow from the reservoir 100 to the hydraulic pump 56 or to allow the hydraulic pump 56 and the hydraulic motor 58 to be bypassed, for example for the mower 10 to be towed. The bypass valve 130 is sealed in the bypass chamber 132 by a suitable seal 131 and held in the chamber 132 by a suitable retainer, such as snap ring 133. One or more stops 135 may be provided for a lever 137 of the bypass valve 130 to limit travel of the lever between the stops.

The pump plate 106 houses the hydraulic pump 56 and includes a seal groove that receives a suitable seal 134, such as an o-ring, to seal a top surface of the pump plate 106 to a bottom surface of the valve plate 104. Extending through the pump plate 106 is the second end of the input shaft 122, which extends into the cavity 124 in the porting plate 108.

A portion of the input shaft 122 proximate the second end meshes with an inner rotor 136 of the hydraulic pump 56, which is surrounded by an outer rotor 138. Rotation of the input shaft 122 causes the inner rotor 136 to move, thereby pumping fluid to the hydraulic motor 58. The input shaft 122 is surrounded by first and second needle bearings 137 and 139, and sealed between the valve plate 104 and casing 102 by a seal 141. The first needle bearing 137 surrounds the input shaft 122 in the valve plate 104 and the second needle bearing 139 surrounds the input shaft 122 in the cavity 124 of the porting plate 108.

Figure 9:
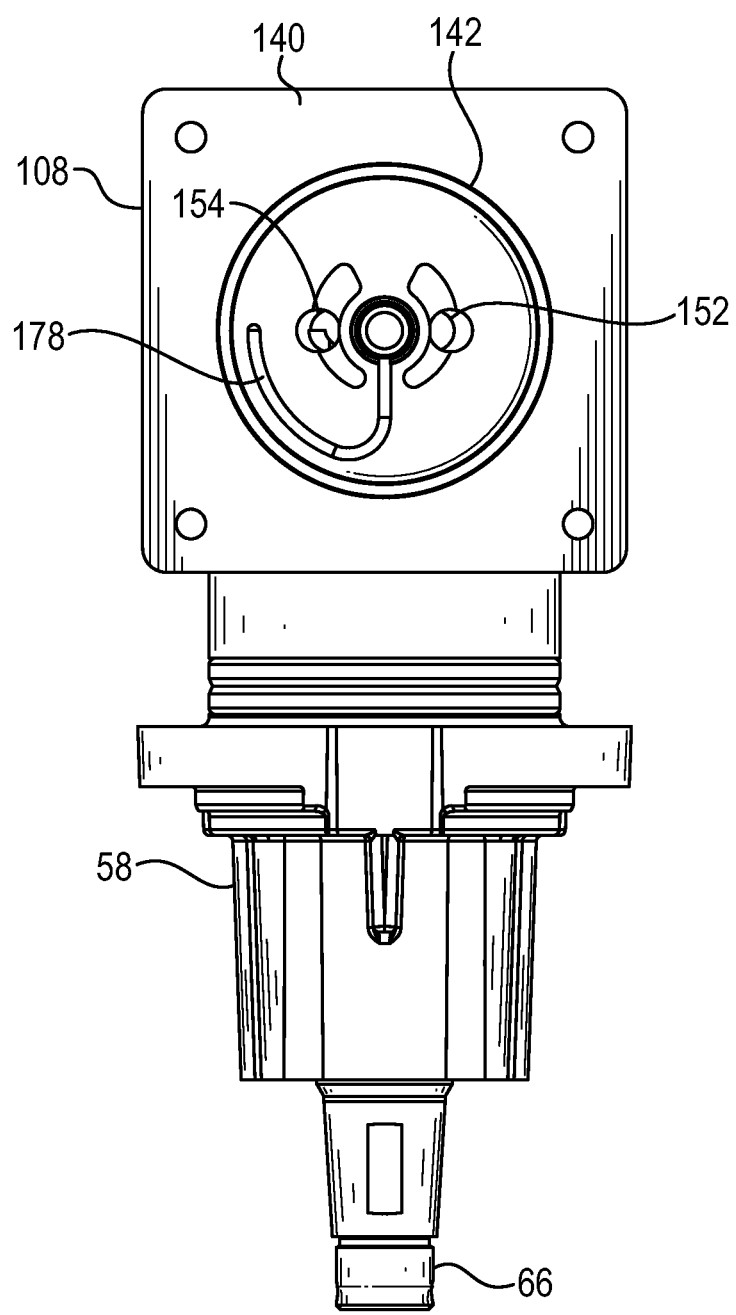
FIG. 9 is a top view of a hydraulic motor and porting plate.
Figure 10:
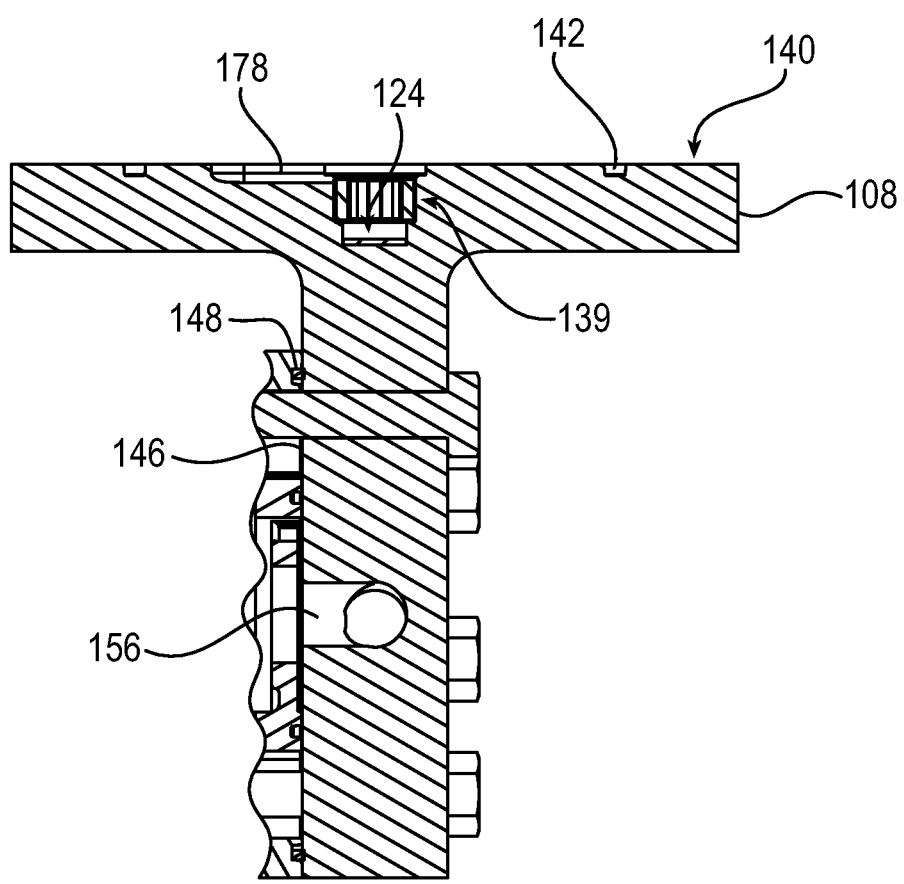
FIG. 10 is a side cross-sectional view of the porting plate and a portion of the hydraulic motor.
Figure 11:
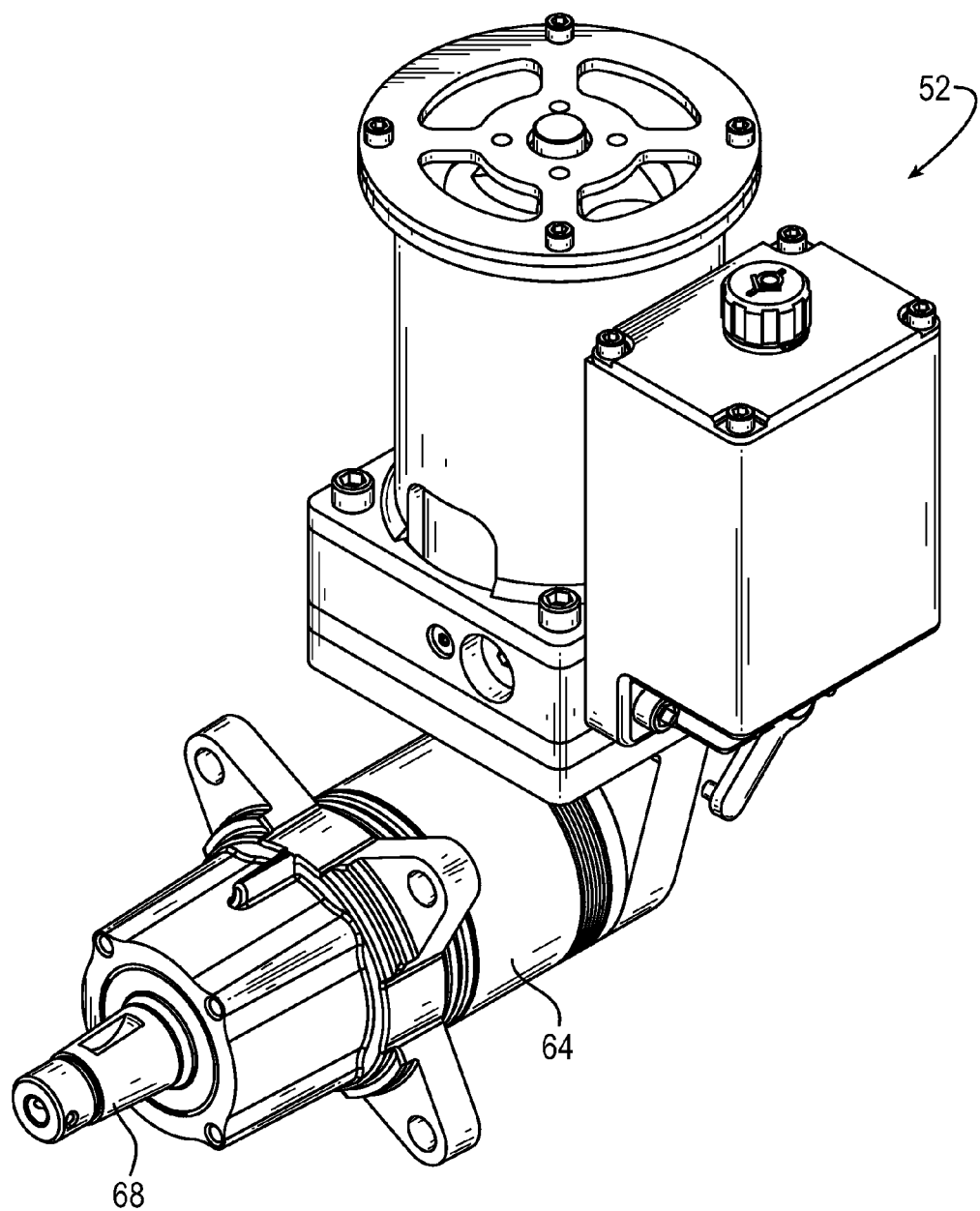
FIG. 11 is a perspective view of an exemplary right hand electro-hydraulic drive assembly.
Figure 12:
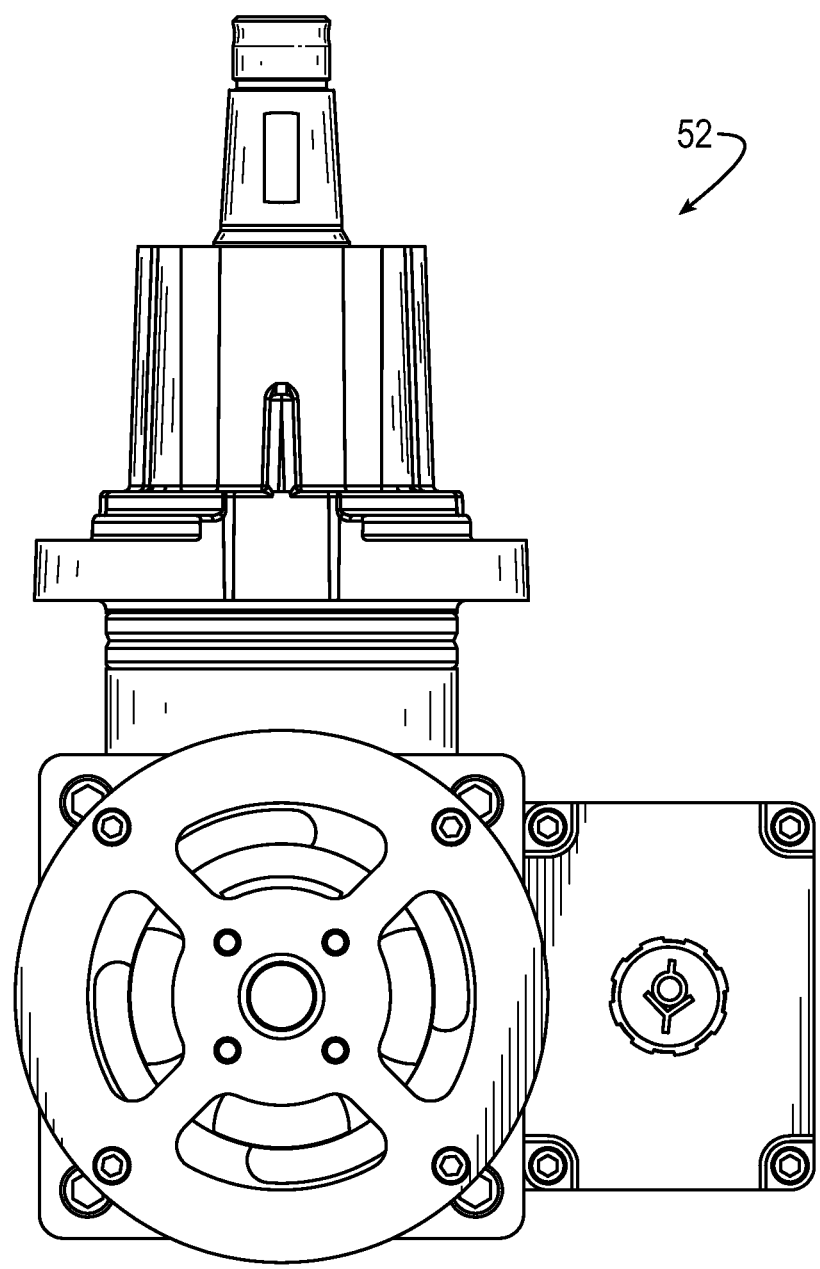
FIG. 12 is a top view of the right hand electro-hydraulic drive assembly.
Figure 13:
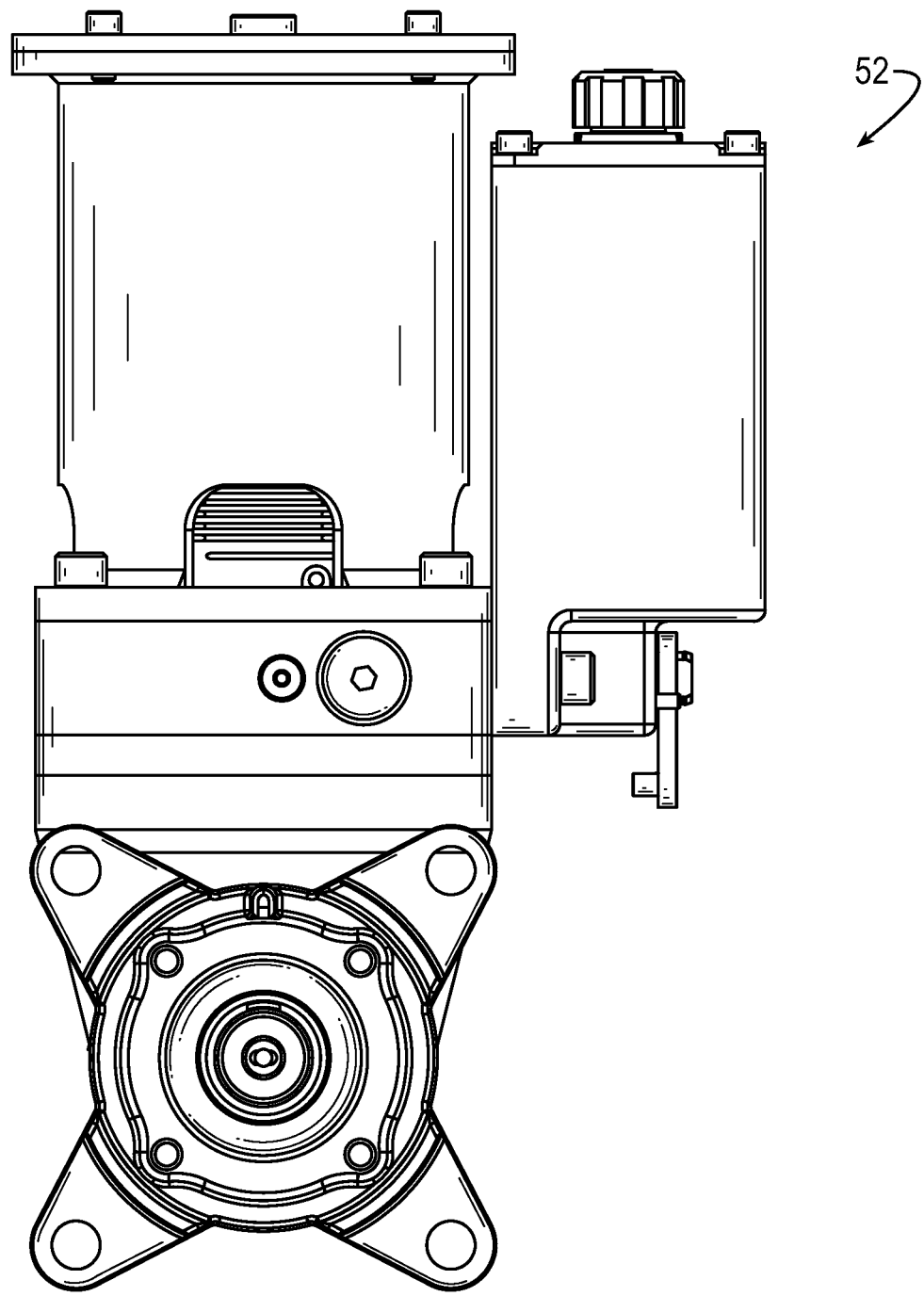
FIG. 13 is a front view of the right hand electro-hydraulic drive assembly.
Figure 14:
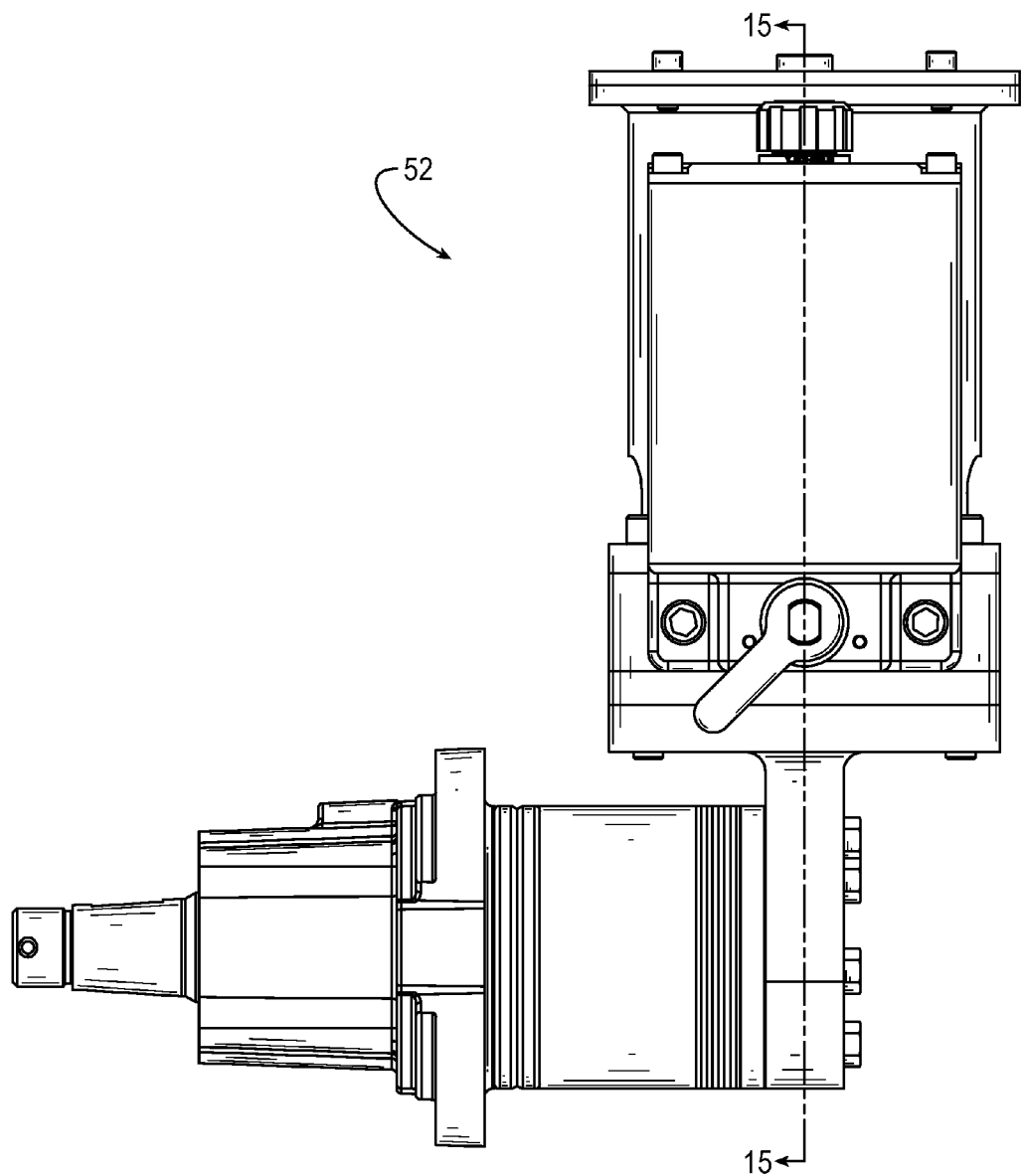
FIG. 14 is a right side view of the right hand electro-hydraulic drive assembly.
Figure 15:
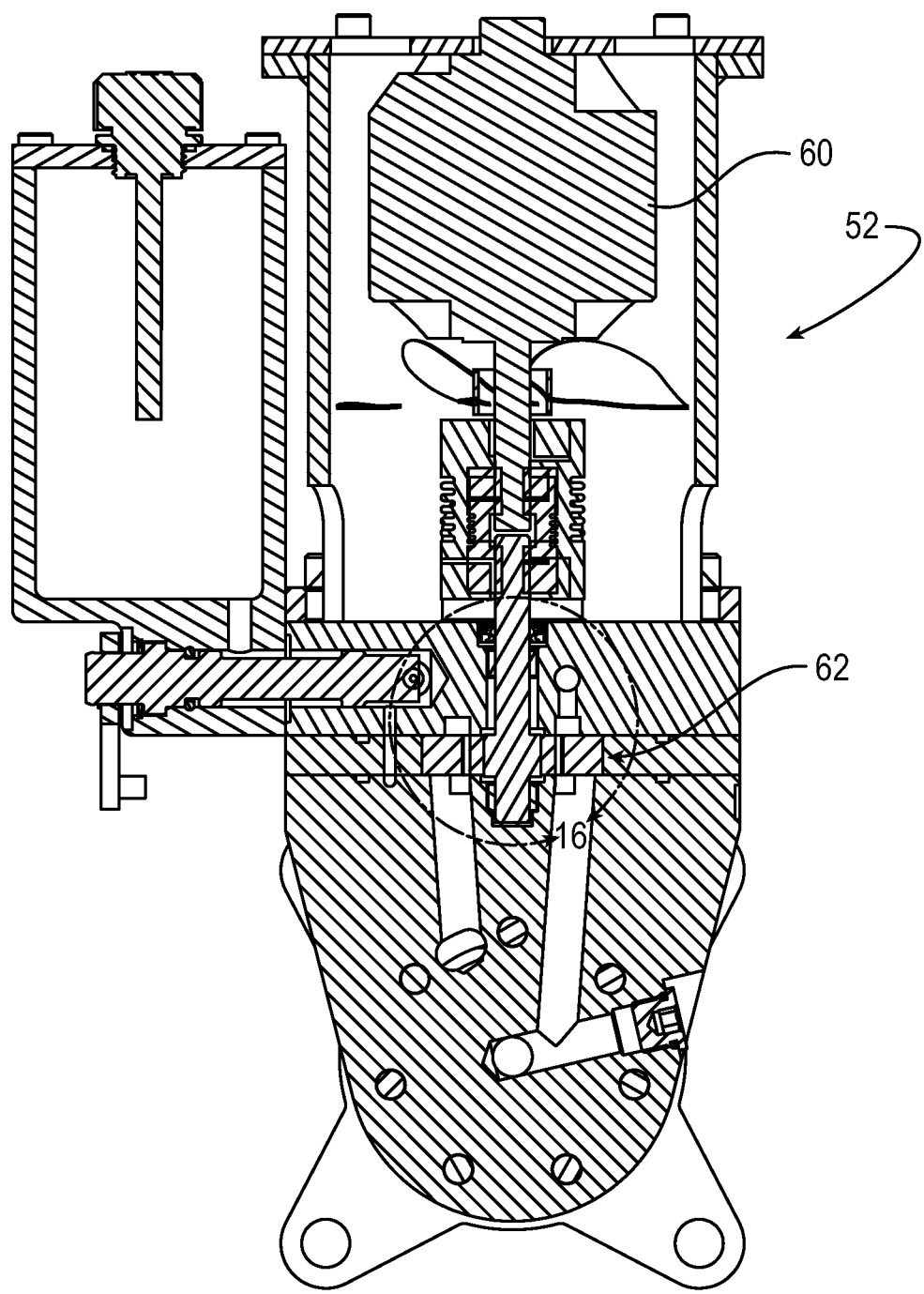
FIG. 15 is a cross-sectional view of the left hand electro-hydraulic drive assembly taken about line A-A in FIG. 14.
Figure 16:
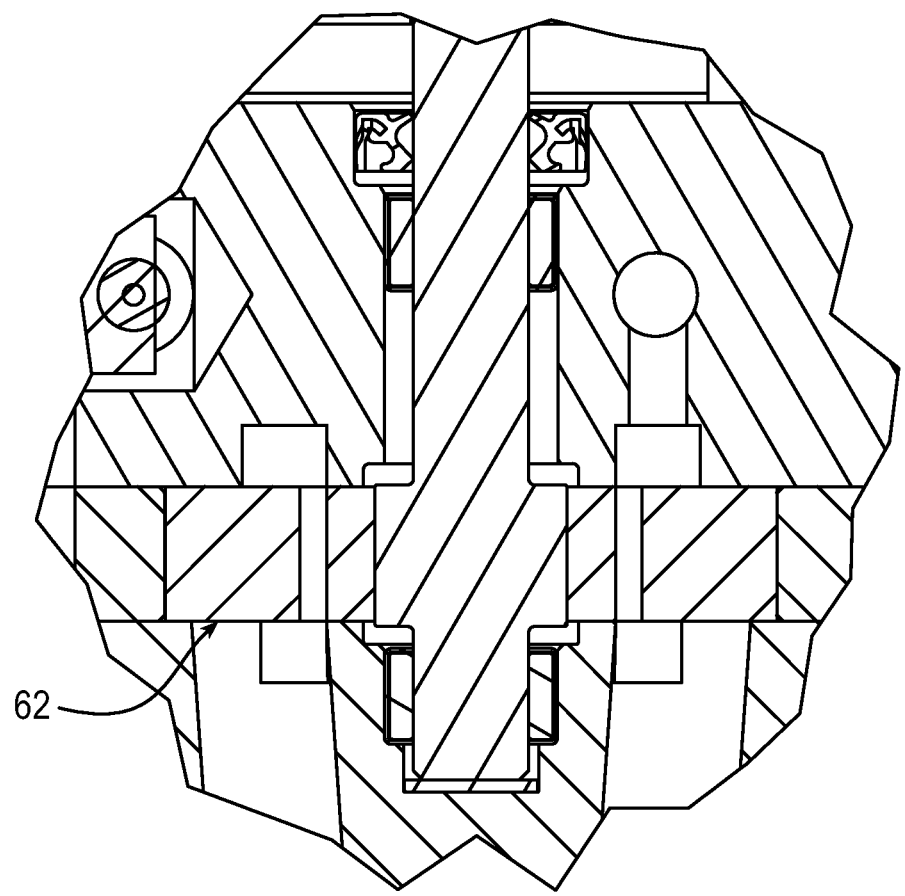
FIG. 16 is an enlarged view of section B-B in FIG. 15.
Figure 17:
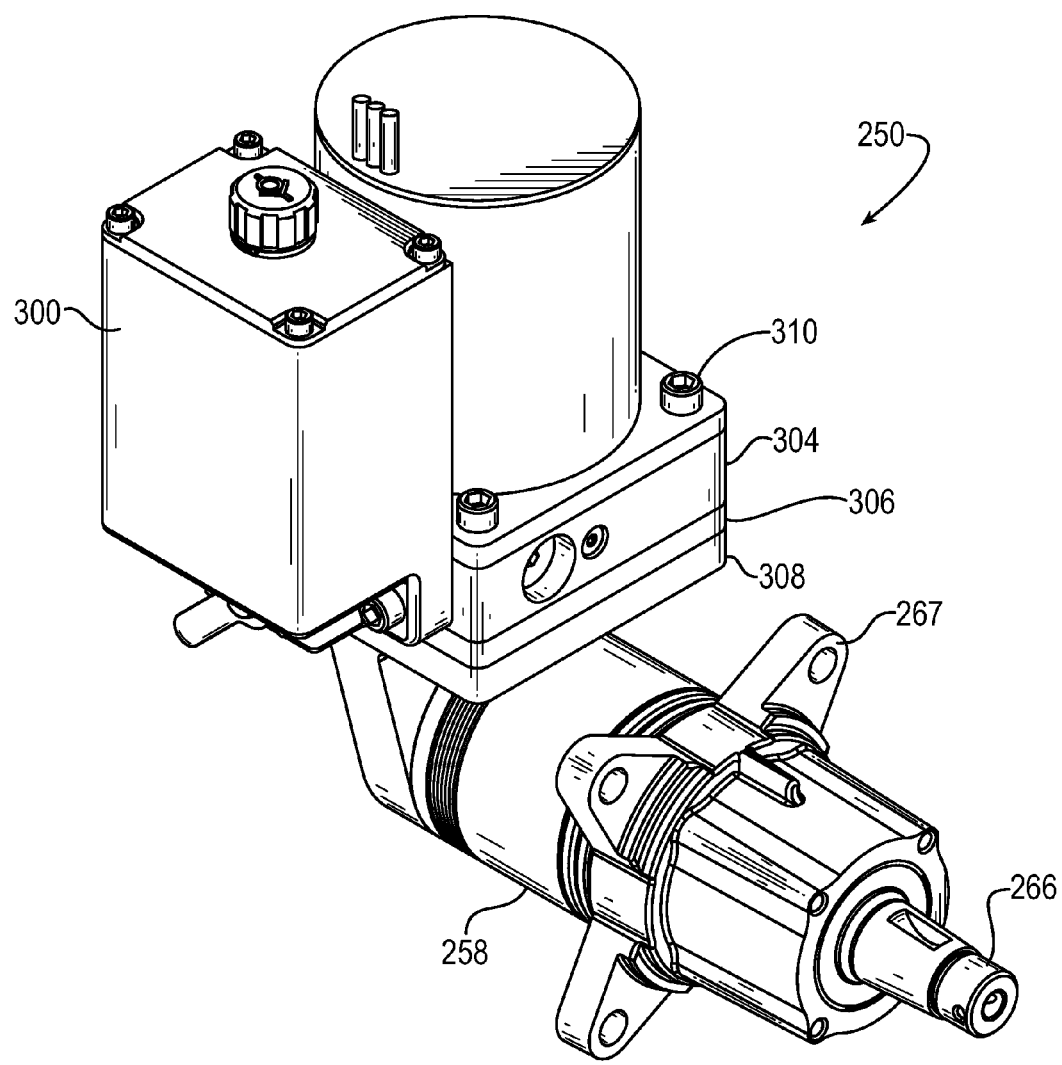
FIG. 17 is a perspective view of another exemplary left hand electro-hydraulic drive assembly.
Figure 18:
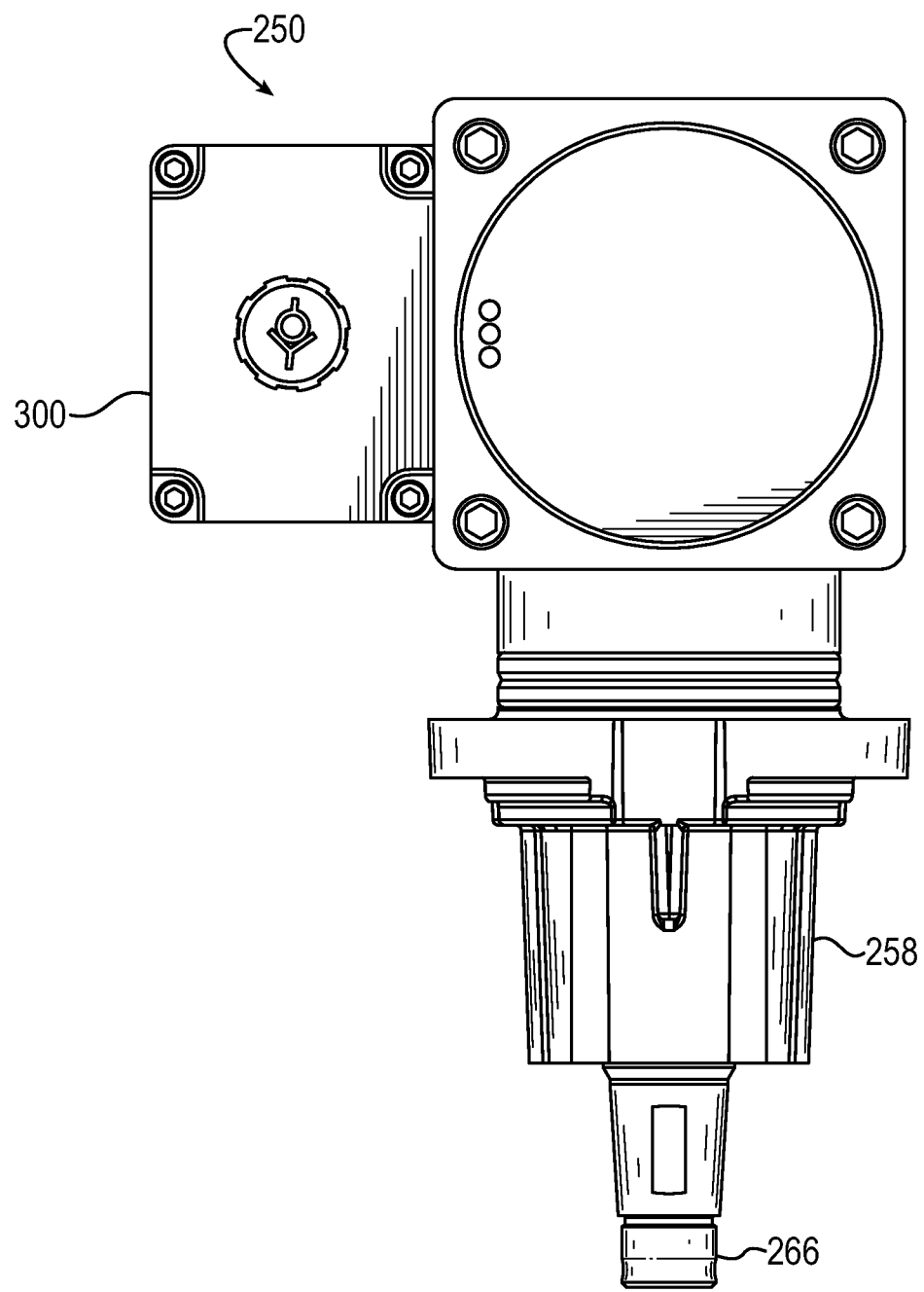
FIG. 18 is a top view of the left hand electro-hydraulic drive assembly.
Figure 19:
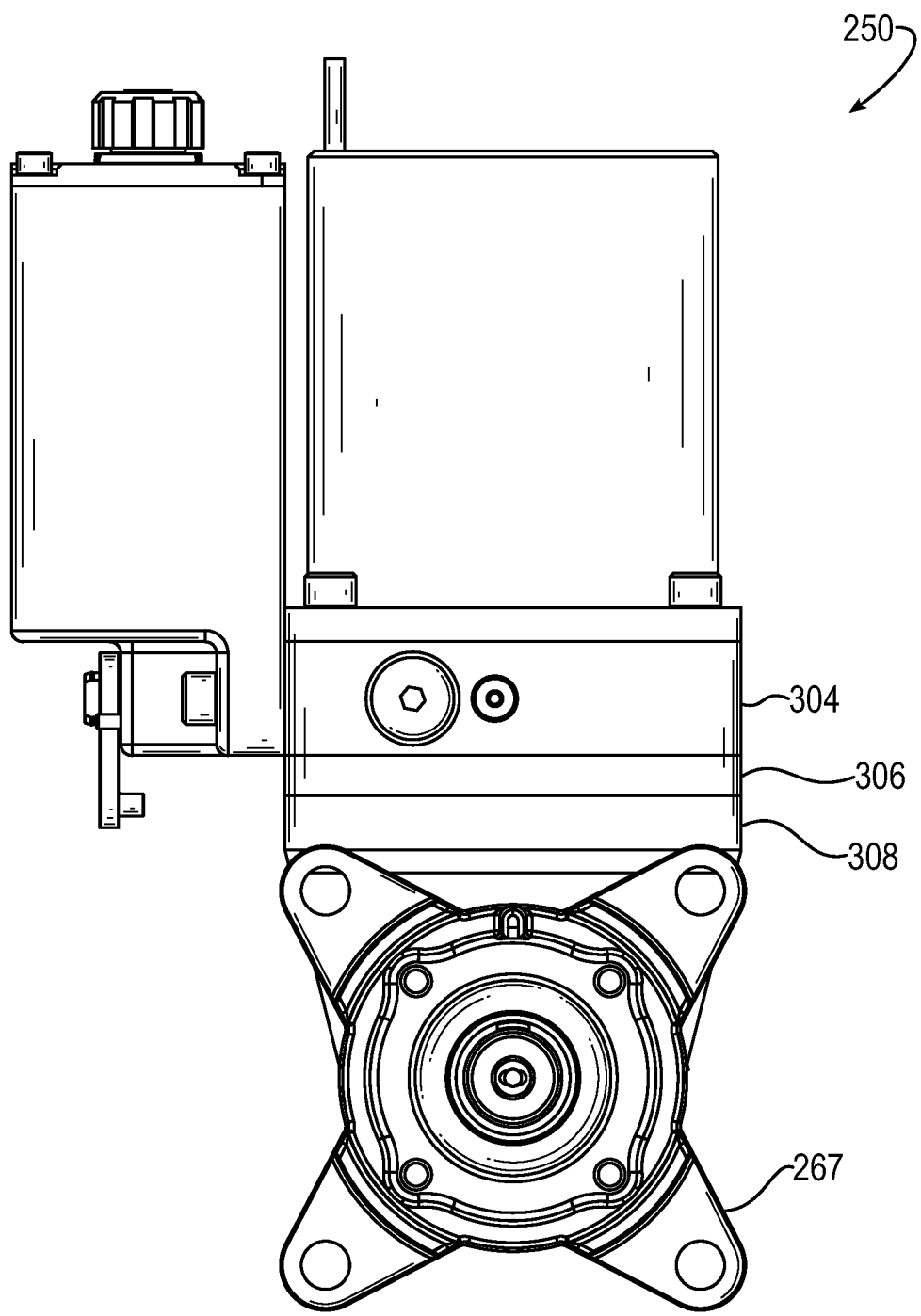
FIG. 19 is a front view of the left hand electro-hydraulic drive assembly.
Figure 20:
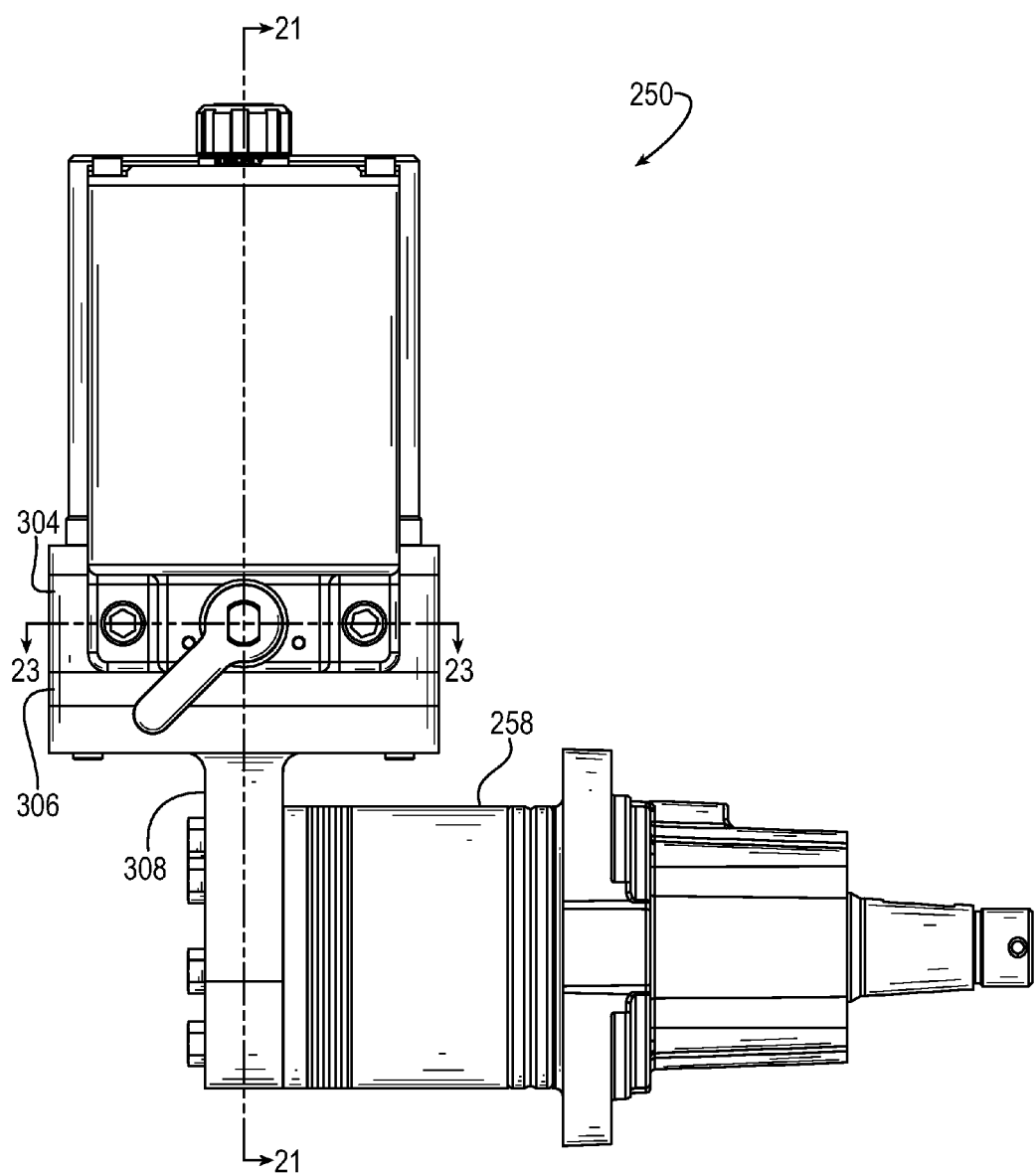
FIG. 20 is a left side view of the left hand electro-hydraulic drive assembly.

As shown in FIG. 9, the porting plate 108 includes a pump mount surface 140 that abuts a bottom surface on the pump plate 106. The pump mount surface 140 includes a seal groove 142 that receives a suitable seal 144, such as an o-ring, for sealing between the pump plate 106 and the porting plate 108. As shown in FIG. 10, the porting plate 108 also includes a motor mount surface 146 that abuts and is coupled to an end port plate 148 of the hydraulic motor 58. The porting plate 108 is coupled to the end port plate 148 in any suitable manner, such as by bolts 150 that extend through the motor mount surface 146 and the end port plate 148 into the motor 58.

The pump mount surface includes ports 152 and 154 for communicating with the hydraulic pump 56. The motor mount surface 146 includes ports 156 and 158 (not shown) for communicating with the hydraulic motor 58, and specifically for communicating with ports in the end port plate 148 that direct fluid into the hydraulic motor to rotate the output shaft 66 of the hydraulic motor 58. Connecting the ports 152 and 154 in the pump mount surface 140 and the ports 156 and 158 in the motor mount surface 146 are first and second fluid flow passages 162 and 164, which are configured to direct the hydraulic fluid between the hydraulic pump 56 and hydraulic motor 58. The passages 162 and 164 in the porting plate 108 may be formed in any suitable manner, such as by drilling through the plate, and portions of one or more of the passages may be plugged by a suitable plug, such as plug 166.

Referring again to FIGS. 7 and 9, fluid may flow to the reservoir 100 from the cavity 124 to provide a bleed passage for fluid trapped below the needle bearing 139, and fluid may flow from the reservoir 100 into the cavity 124 below the needle bearing 139 as needed. To accomplish the foregoing, hydraulic fluid can flow to/from the reservoir 100 through a passage 170 at a bottom of the reservoir 100 and into the bypass chamber 132. The fluid can flow through the chamber 132 and around flats 172 on the bypass valve 130 to a passage 174 at the bottom of the valve plate 104. The fluid then flows through a passage 176 extending through the pump plate 106 to a passage 178 in the porting plate 108, and then to the cavity 124 in the porting plate 108. The passage 178 is a serpentine passage that extends from an area in between the seal groove 142 and the port 154 to the cavity 124 in the porting plate 108 between the ports 152 and 154.

Turning now to FIGS. 17-23, an exemplary embodiment of the first electro-hydraulic drive assembly is shown at 250. The first electro-hydraulic drive assembly 250 is substantially the same as the above-referenced first electro-hydraulic drive assembly 50, and consequently the same reference numerals but indexed by 200 are used to denote structures corresponding to similar structures in the first electro-hydraulic drive assembly. In addition, the foregoing description of the first electro-hydraulic drive assembly 50 is equally applicable to the first electro-hydraulic drive assembly 250 except as noted below. Moreover, it will be appreciated upon reading and understanding the specification that aspects of the electro-hydraulic assemblies may be substituted for one another or used in conjunction with one another where applicable.

Figure 21:
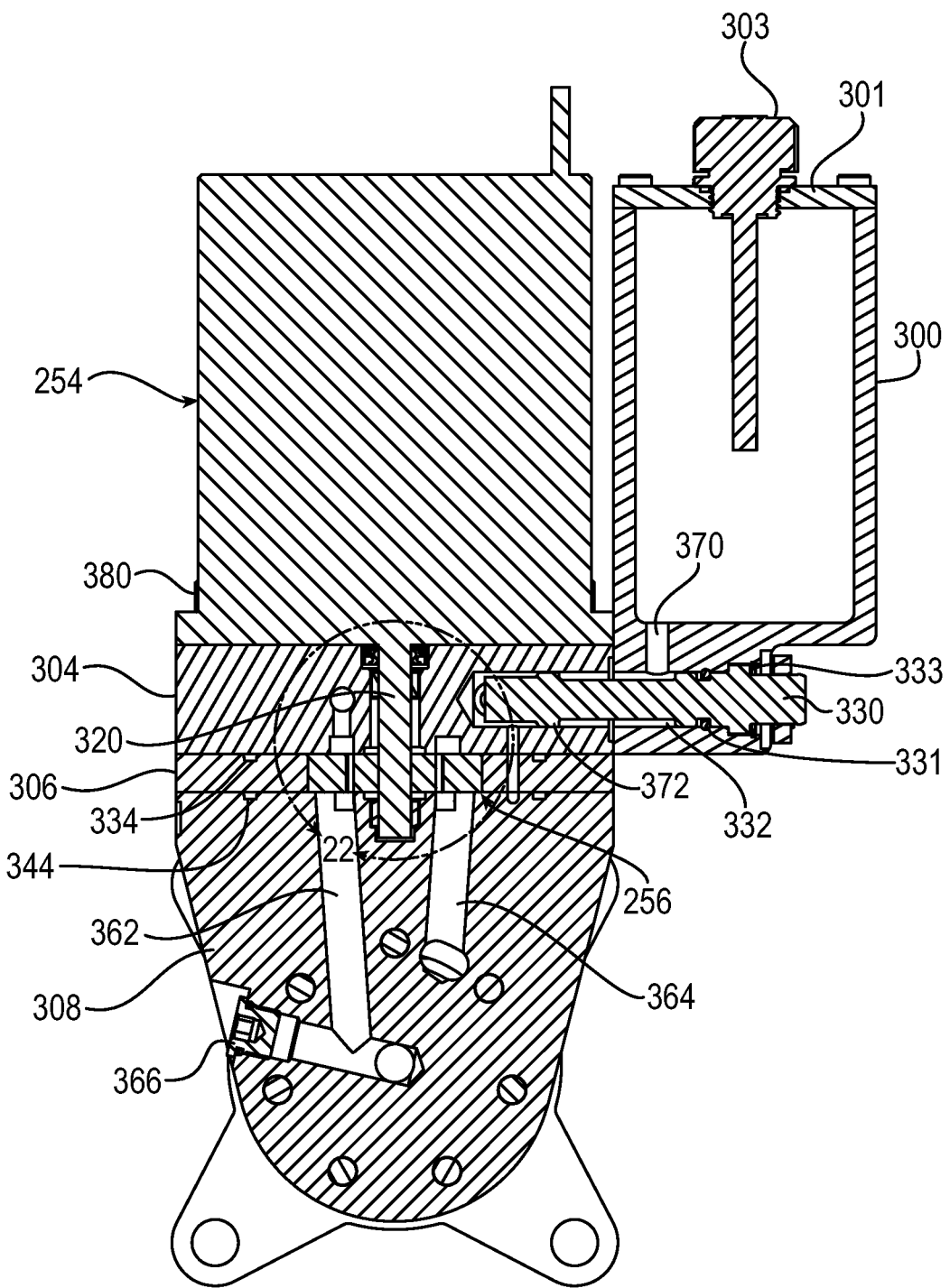
FIG. 21 is a cross-sectional view of the left hand electro-hydraulic drive assembly taken about line A-A in FIG. 20.
Figure 22:
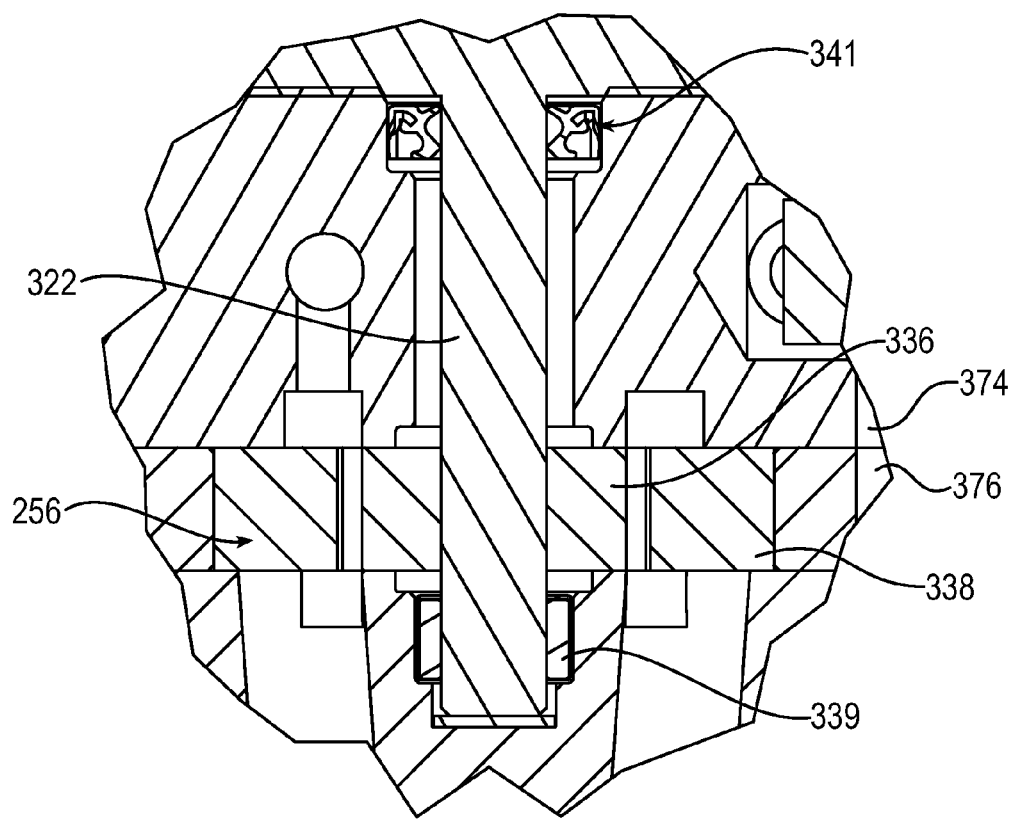
FIG. 22 is an enlarged view of section B-B in FIG. 21.

Referring to FIG. 21, the electro-hydraulic drive assembly 250 includes the first electric motor 254, the first hydraulic pump 256, and the first hydraulic motor 258. The electric motor 254 is enclosed in a motor casing 380 and is bolted to the valve plate 304. The electric motor includes an output shaft 320 that extends through the valve plate 304 and the pump plate 306 to mesh with a rotor 336 of the hydraulic pump 256 to directly drive the hydraulic pump 256.

Figure 23:
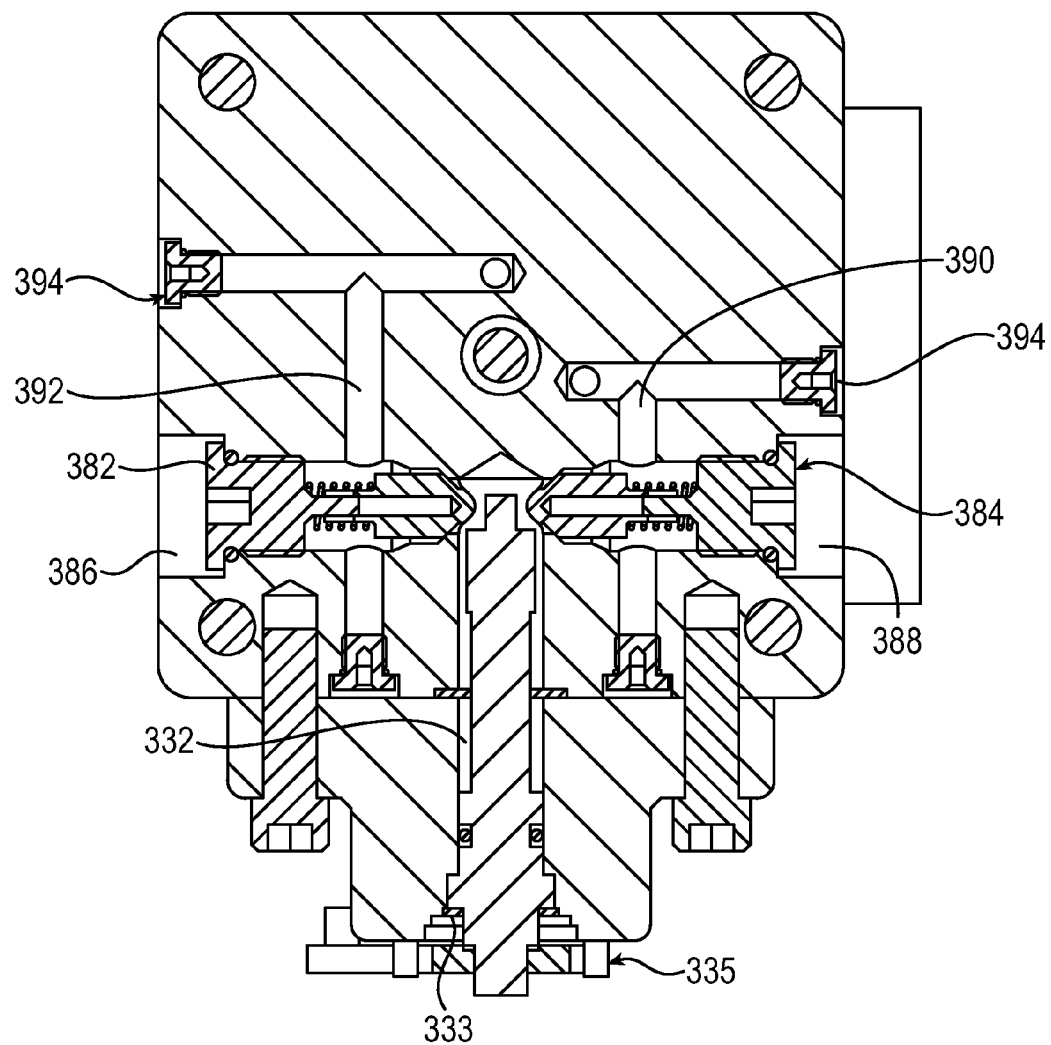
FIG. 23 is a cross-sectional view of the left hand electro-hydraulic drive assembly taken about line C-C in FIG. 20.

Referring to FIG. 23, the valve plate 304 includes a plurality of suitable valves for controlling hydraulic fluid flow to the hydraulic pump 256, such as check valves 382 and 384. The valves are disposed in respective valve chambers 386 and 388, which communicate with the bypass chamber 332 and passages 390 and 392. Portions of the passages 390 and 392 may be plugged by a suitable plug, such as plug 394.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A mower comprising:
    an engine;
    an electro-hydraulic drive system including:
        a first electro-hydraulic transmission for driving a first wheel, the first electro-hydraulic transmission including a first electric motor, a first hydraulic pump coupled to and driven by the first electric motor, and a first hydraulic motor coupled to and driven by the first hydraulic pump, the hydraulic motor including an output shaft for driving the wheel; and
        a second electro-hydraulic transmission for driving a second wheel, the second electro-hydraulic transmission including a second electric motor, a second hydraulic pump coupled to and driven by the second electric motor, and a second hydraulic motor coupled to and driven by the second hydraulic pump, the hydraulic motor including an output shaft for driving the wheel,
    wherein the electro-hydraulic drive system is operable during a normal operating state of the engine and wherein the electro-hydraulic drive system is operable when the engine is in a non-operating state.

2. The mower according to claim 1, further including at least one controller coupled to the first and second electric motors for controlling the first and second electric motors.

3. The mower according to claim 2, further including a storage device coupled to the controller, wherein the storage device is configured to power the first and second electric motors.

4. The mower according to claim 3, wherein the storage device includes at least one battery and/or capacitor.

5. The mower according to claim 1, wherein the first and second hydraulic pumps are gerotor pumps.

6. The mower according to claim 1, wherein the first and second hydraulic motors are gerotor motors.

7. The mower according to claim 1, wherein the first and second electro-hydraulic transmissions additionally include first and second reservoirs respectively for fluid to flow to/from the respective hydraulic pump.

8. The mower according to claim 1, wherein the first and second electro-hydraulic transmissions additionally include first and second pump plates respectively that house the first and second hydraulic pumps respectively.

9. The mower according to claim 8, wherein the first and second electro-hydraulic transmissions additionally include first and second porting plates respectively, each porting plate having a pump mount surface coupled to the respective pump plate and a motor mount surface coupled to an end port plate of the respective hydraulic motor, wherein the porting plates include first and second fluid passages for directing hydraulic fluid between the hydraulic pumps and hydraulic motors.

10. The mower according to claim 9, wherein the pump mount surface of each porting plate includes a path for allowing hydraulic fluid to flow to/from a cavity in the pump mount surface below the hydraulic pump from/to a reservoir.

11. The mower according to claim 9, wherein the first and second electro-hydraulic transmissions additionally include first and second valve plates coupled to the first and second pump plates respectively on sides of the pump plates opposite the porting plates, wherein the valve plates house respective bypass valves for bypassing the electro-hydraulic drive system.

12. The mower according to claim 1, wherein the first and second electric motors include first and second output shafts respectively, and the first and second hydraulic pumps include first and second input shafts respectively, wherein the first and second output shafts are respectively coupled to the first and second input shafts for driving the respective hydraulic pumps.

13. The mower according to claim 12, wherein the first and second electro-hydraulic transmissions additionally include first and second couplers respectively that couple the first and second input shafts to the first and second output shafts respectively.

14. A mower including:
a frame;
a mower deck supported by the frame;
an engine mounted to the frame and configured to power the mower deck;
an electro-hydraulic drive system including:
a first electro-hydraulic transmission for driving a first wheel, the first electro-hydraulic transmission including a first electric motor, a first hydraulic pump coupled to and driven by the first electric motor, and a first hydraulic motor coupled to and driven by the first hydraulic pump, the hydraulic motor including an output shaft for driving the wheel, wherein each of the first hydraulic pump, the first electric motor, and the first hydraulic motor are mounted relative to a first common housing; and
a second electro-hydraulic transmission for driving a second wheel, the second electro-hydraulic transmission including a second electric motor, a second hydraulic pump coupled to and driven by the second electric motor, and a second hydraulic motor coupled to and driven by the second hydraulic pump, the hydraulic motor including an output shaft for driving the wheel, wherein each of the second hydraulic pump, the second electric motor, and the second hydraulic motor are mounted relative to a second common housing; and
a controller coupled to the first and second electric motors for controlling the first and second motors,
wherein the electro-hydraulic drive system is operable during a normal operating state of the engine and wherein the electro-hydraulic drive system is operable when the engine is in a non-operating state.

15. The mower according to claim 14, further including a storage device coupled to the controller, wherein the storage device is configured to power the first and second electric motors.

16. The mower according to claim 15, wherein the electro-hydraulic drive system operates independently from the engine.

17. The mower according to claim 15, further including a generator coupled to the controller and an output shaft of the engine, the generator being configured to charge the storage device.

18. The mower of claim 1, wherein the electro-hydraulic drive system is modular, the first electro-hydraulic transmission being a first module and the second electro-hydraulic transmission being a second module.

* * * * *